US010641939B2

(12) United States Patent
Fini et al.

(10) Patent No.: US 10,641,939 B2
(45) Date of Patent: May 5, 2020

(54) BEAM TURNING ASSEMBLY WITH POLARIZATION SPLITTER

(71) Applicant: Ayar Labs, Inc., Emeryville, CA (US)

(72) Inventors: John Fini, San Francisco, CA (US); Roy Edward Meade, Boise, ID (US); Derek Van Orden, San Francisco, CA (US); Mark Wade, Oakland, CA (US)

(73) Assignee: Ayar Labs, Inc., Emeryville, CA (US)

( * ) Notice: Subject to any disclaimer, the term of this patent is extended or adjusted under 35 U.S.C. 154(b) by 170 days.

(21) Appl. No.: 15/982,947

(22) Filed: May 17, 2018

(65) Prior Publication Data

US 2018/0335558 A1 Nov. 22, 2018

Related U.S. Application Data

(60) Provisional application No. 62/508,688, filed on May 19, 2017.

(51) Int. Cl.
*G02B 5/30* (2006.01)
*F21V 8/00* (2006.01)
(Continued)

(52) U.S. Cl.
CPC ......... *G02B 5/3083* (2013.01); *G02B 6/0006* (2013.01); *G02B 6/0008* (2013.01);
(Continued)

(58) Field of Classification Search
CPC .. G02B 5/3083; G02B 6/0008; G02B 6/2706; G02B 6/2773; G02B 6/30; G02B 6/34; G02B 27/283
(Continued)

(56) References Cited

U.S. PATENT DOCUMENTS 4,709,144 A * 11/1987 Vincent ................. G01J 3/2803
250/226
4,720,162 A * 1/1988 Mochizuki ........... G02B 6/2713
385/11
(Continued)

FOREIGN PATENT DOCUMENTS

WO WO2016011002 A1 1/2016

OTHER PUBLICATIONS

International Search Report, PCT/US2018/033393, dated Sep. 24, 2018, 5 pages.
(Continued)

*Primary Examiner* — Ricky D Shafer
(74) *Attorney, Agent, or Firm* — Penilla IP, APC

(57) ABSTRACT

A first reflecting region is positioned at an end of an optical fiber and includes a polarization-sensitive reflector configured to selectively reflect a first polarization of light emanating from the optical fiber into a first reflected beam and transmit light that is not of the first polarization. The first reflected beam is directed toward a first optical grating coupler on a chip. A spacer layer is disposed on the first reflecting region such that light transmitted from the first reflecting region enters and passes through the spacer layer. A second reflecting region is disposed on the spacer layer and is configured to reflect light that is incident upon the second reflecting region into a second reflected beam directed toward a second optical grating coupler on the chip. A thickness of the spacer layer is set to control a separation distance between the first reflected beam and the second reflected beam.

26 Claims, 17 Drawing Sheets

(51) Int. Cl.
*G02B 27/28* (2006.01)
*G02B 6/27* (2006.01)
*G02B 6/30* (2006.01)
*G02B 6/34* (2006.01)
*G02B 27/09* (2006.01)
*G02B 5/28* (2006.01)

(52) U.S. Cl.
CPC ......... *G02B 6/2706* (2013.01); *G02B 6/2773* (2013.01); *G02B 6/30* (2013.01); *G02B 6/34* (2013.01); *G02B 27/283* (2013.01); *G02B 5/285* (2013.01); *G02B 27/0977* (2013.01)

(58) Field of Classification Search
USPC .................. 359/485.02, 489.09, 489.11, 900
See application file for complete search history.

(56) References Cited

U.S. PATENT DOCUMENTS

| | | | | |
|---|---|---|---|---|
| 5,040,863 | A * | 8/1991 | Kawakami | G02B 6/4208 264/1.31 |
| 5,151,889 | A * | 9/1992 | Saimi | G11B 7/12 369/112.21 |
| 5,650,874 | A * | 7/1997 | Shuman | G02B 27/143 359/485.03 |
| 5,864,425 | A * | 1/1999 | Filas | G02B 5/08 359/360 |
| 7,162,124 | B1 | 1/2007 | Gunn, III et al. | |
| 9,798,084 | B2 * | 10/2017 | Verslegers | G02B 6/126 |
| 2008/0267562 | A1 * | 10/2008 | Wang | A61B 5/0062 385/31 |
| 2010/0006784 | A1 | 1/2010 | Mack et al. | |
| 2015/0234221 | A1 | 8/2015 | Anderson et al. | |
| 2016/0246009 | A1 * | 8/2016 | Jiang | G02B 6/124 |
| 2016/0377811 | A1 * | 12/2016 | Goodwill | G02B 6/2706 385/24 |
| 2017/0207600 | A1 | 7/2017 | Klamkin et al. | |
| 2018/0239095 | A1 * | 8/2018 | Wade | G02B 6/423 |
| 2019/0384020 | A1 * | 12/2019 | Fini | G02B 6/4214 |

OTHER PUBLICATIONS

Jacques Mouchart, Jacqueline Begel, and Eugene Duda, "Modified MacNeille Cube Polarizer for a Wide Angular Field," Applied Optics 28.14 (1989): 2847-2853.

Li Li and J. A. Dobrowolski, "Visible Broadband, Wide-Angle, Thin-Film Multilayer Polarizing Beam Splitter," Applied Optics 35.13 (1996): 2221-2225.

M. Morimoto, K Suematsu, R. Sugizaki, K. Takahashi, and H. Nasu, "90-degree-Bent with R=1mm Optical Fiber Technique for Optical Interconnection," Organic Photonic Materials and Devices X, Proceedings of SPIE vol. 6891, 68910F, (2008).

Ludvik Martinu and Daniel Poitras, "Plasma Deposition of Optical Films and Coatings: A Review," J. Vac. Sci. Technol. A 18(6), Nov./Dec. 2000: 2619-2645.

Mark T. Wade, Fabio Pavanello, Rajesh Kumar, Cale M. Gentry, Amir Atabaki, Rajeev Ram, Vladimir Stojanovic, and Milos A. Popovic, "75% Efficient Wide Bandwidth Grating Couplers in a 45 nm Microelectronics CMOS Process," Optical Interconnects Conference (OI), 2015 IEEE.

Jelena Notaros, Fabio Pavanello, Mark T. Wade, Cale M. Gentry, Amir Atabaki, Luca Alloatti, Rajeev J. Ram, and Milos A. Popovic, "Ultra-Efficient CMOS Fiber-to-Chip Grating Couplers," Optical Fiber Communications Conference and Exhibition (OFC), 2016 IEEE, 2016.

* cited by examiner

```
                                                    ┌─ 1501
┌──────────────────────────────────────────────────────┐
│ Place first reflecting region at at an end of the optical fiber, the first reflecting │
│   region including a polarization-sensitive reflector configured to selectively    │
│   reflect a first polarization of light emanating from the optical fiber into a first │
│   reflected beam, the first reflecting region also configured to transmit light    │
│   emanating from the optical fiber that is not of the first polarization, the first  │
│   reflected beam directed toward a first optical grating coupler on the chip.      │
└──────────────────────────────────────────────────────┘
                           │
                           ▼                       ┌─ 1503
┌──────────────────────────────────────────────────────┐
│ Place spacer layer on the first reflecting region such that light transmitted      │
│   from the first reflecting region enters and passes through the spacer layer.    │
└──────────────────────────────────────────────────────┘
                           │
                           ▼                       ┌─ 1505
┌──────────────────────────────────────────────────────┐
│ Place second reflecting region on the spacer layer, the second reflecting         │
│ region configured to reflect light that is incident upon the second reflecting    │
│ region into a second reflected beam, the second reflected beam directed           │
│         toward a second optical grating coupler on the chip.                      │
└──────────────────────────────────────────────────────┘
                           │
                           ▼                       ┌─ 1507
┌──────────────────────────────────────────────────────┐
│ Use thickness of the spacer layer to control a separation distance between       │
│         the first reflected beam and the second reflected beam.                  │
└──────────────────────────────────────────────────────┘
```

Fig. 15

BEAM TURNING ASSEMBLY WITH POLARIZATION SPLITTER

CLAIM OF PRIORITY

This application claims priority under 35 U.S.C. 119(e) to U.S. Provisional Patent Application No. 62/508,688, filed May 19, 2017, the disclosure of which is incorporated herein by reference in its entirety for all purposes.

BACKGROUND

The present invention relates to optical data communication. Optical data communication systems operate by modulating laser light to encode digital data patterns. The modulated laser light is transmitted through an optical data network from a sending node to a receiving node. The modulated laser light having arrived at the receiving node is de-modulated to obtain the original digital data patterns. Therefore, implementation and operation of optical data communication systems is dependent upon having reliable and efficient mechanisms for transmitting laser light and detecting laser light at different nodes within the optical data network. In this regard, it is necessary to transmit light from an optical fiber to a photonic chip, and vice-versa. It is within this context that the present invention arises.

SUMMARY

In an example embodiment, an optical beam-turning assembly is disclosed. The optical beam-turning assembly includes a first reflecting region positioned at an end of an optical fiber. The first reflecting region includes a polarization-sensitive reflector configured to selectively reflect a first polarization of light emanating from the optical fiber into a first reflected beam. The first reflecting region is also configured to transmit light emanating from the optical fiber that is not of the first polarization. The first reflected beam is directed toward a first optical grating coupler on a chip. The optical beam-turning assembly includes a spacer layer disposed on the first reflecting region such that light transmitted from the first reflecting region enters and passes through the spacer layer. The optical beam-turning assembly includes a second reflecting region disposed on the spacer layer. The second reflecting region is configured to reflect light that is incident upon the second reflecting region into a second reflected beam. The second reflected beam is directed toward a second optical grating coupler on the chip. A thickness of the spacer layer is set to control a separation distance between the first reflected beam and the second reflected beam.

In an example embodiment, a method is disclosed for turning light from an optical fiber into a chip. The method includes an operation for placing a first reflecting region at an end of the optical fiber. The first reflecting region includes a polarization-sensitive reflector configured to selectively reflect a first polarization of light emanating from the optical fiber into a first reflected beam. The first reflecting region is also configured to transmit light emanating from the optical fiber that is not of the first polarization. The first reflected beam is directed toward a first optical grating coupler on the chip. The method also includes an operation for placing a spacer layer on the first reflecting region such that light transmitted from the first reflecting region enters and passes through the spacer layer. The method also includes an operation for placing a second reflecting region on the spacer layer. The second reflecting region is configured to reflect light that is incident upon the second reflecting region into a second reflected beam. The second reflected beam is directed toward a second optical grating coupler on the chip. The method also includes an operation for using a thickness of the spacer layer to control a separation distance between the first reflected beam and the second reflected beam.

In an example embodiment, an optical assembly is disclosed. The optical assembly includes a base structure configured to receive an optical fiber. The base structure is configured to align an axis of a core of the optical fiber in a prescribed direction. The optical assembly also includes an angled reflector spatially indexed to the base structure. The angled reflector is positioned to receive light from the core of the optical fiber. The angled reflector is configured to reflect a first polarization of the received light as a first reflected beam toward a first optical coupling site on a photonic chip. The angled reflector is also configured to reflect a second polarization of the received light as a second reflected beam toward a second optical coupling site on the photonic chip.

In an example embodiment, a method is disclosed for turning light from an optical fiber into a chip. The method includes an operation for intercepting a beam of light emanating from an optical fiber with a first angled reflector, where the first angled reflector is configured and oriented to reflect a first polarization of the beam of light into a first reflected beam, such that the first reflected beam is directed toward a first optical coupling site on a photonic chip. The first angled reflector is also configured to allow transmission of a portion of the beam of light that is not of the first polarization through the first angled reflector. The method also includes an operation for intercepting the portion of the beam of light that is transmitted through the first angled reflector with a second angled reflector, where the second angled reflector is configured and oriented to reflect the portion of the beam of light that is incident upon the second angled reflector into a second reflected beam, such that the second reflected beam is directed toward a second optical coupling site on the photonic chip.

BRIEF DESCRIPTION OF THE DRAWINGS

FIG. 15 shows a flowchart of a method for turning light from an optical fiber into a chip, in accordance with some embodiments of the present invention.

DETAILED DESCRIPTION

Figure 1A:
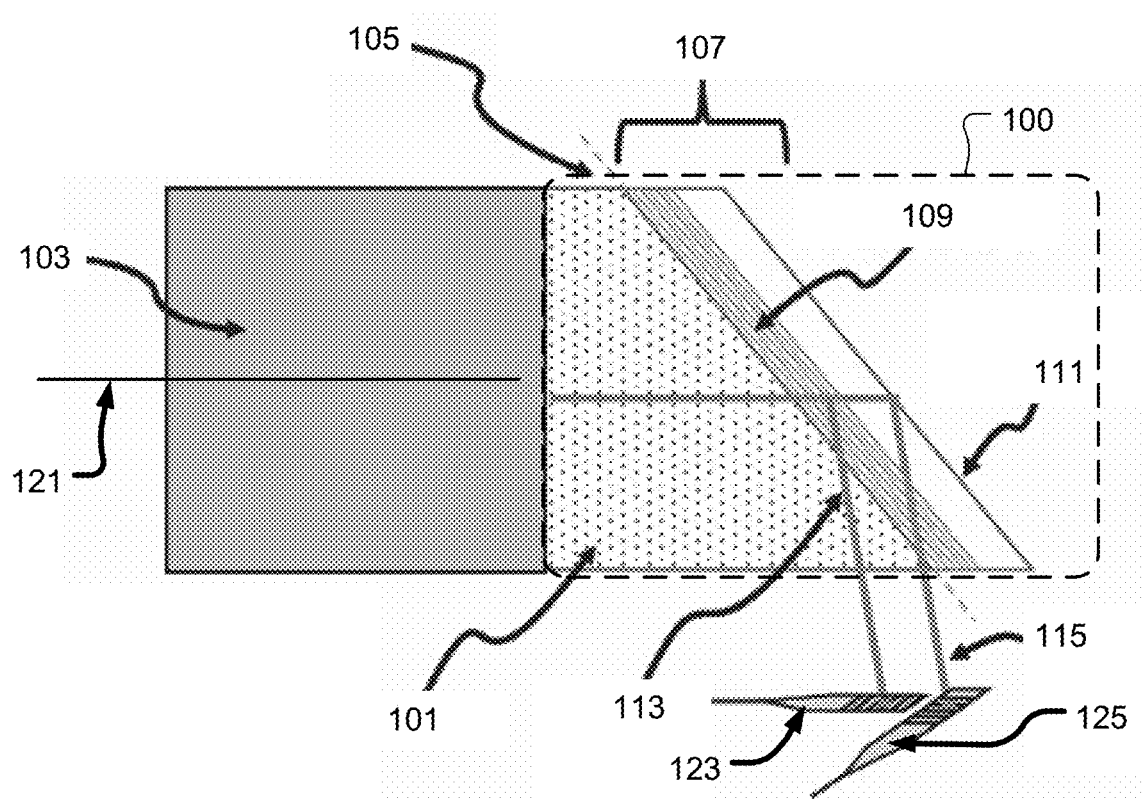
FIG. 1A shows an example beam-turning assembly, in accordance with some embodiments of the present invention.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

In fiber-optic data communication systems, polarizing beam (i.e., light beam) splitters pass light of one polarization in a first direction, while re-directing light of a second polarization in a different direction. Such a function may be accomplished using Bragg-reflector stacks sandwiched between two prisms, and having index values meeting the Brewster condition, such that the Bragg reflection is highly polarization sensitive. These types of beam splitters are suitable for free-space applications using bulk optical components, and can be incorporated into discrete optical fiber-coupled components.

Also, in fiber-optic data communication systems, light is coupled from an optical fiber to a photonic chip, and vice-versa, and various approaches are being explored for optical fiber-to-chip coupling, one goal of which is to achieve scalable manufacturing of packaged devices incorporating integrated optics. Various embodiments for coupling light from an optical fiber to a photonic chip implement edge-coupling techniques and/or vertical-coupling techniques. In some edge-coupling techniques, light is coupled at the edge of a chip to optical fibers parallel and flush with on-chip waveguides. In some vertical-coupling techniques, a beam-turning element is implemented to allow horizontal packaging of optical fibers, which can improve the mechanically robustness of a packaged device, i.e., of a photonic chip within optical fiber(s) attached thereto. Also, in some packaged device configurations, a beam-turning connector for optical fiber-to-chip coupling can utilize one or more bent optical fiber(s), where multiple optical fibers can be ribbonized for scalability.

One challenge in optical fiber-to-chip coupling is that optical fibers typically carry light of two polarizations, while on-chip devices and waveguides are commonly single-polarization, so that a polarization multiplexing function is required. In some embodiments, this polarization multiplexing function can be achieved using an on-chip dual-polarization optical grating coupler, a type of vertical coupler that couples light from each of two on-chip waveguides to a different optical fiber polarization. However, because dual-polarization optical grating couplers can have substantially higher loss than single-polarization optical grating couplers, it can be beneficial to separate implementation of the polarization multiplexing function from the optical grating coupler.

With the above-mentioned issues in mind, it should be noted that polarizing beam-splitters employing multilayer dielectric stacks are not generally suitable for use in optical fiber-to-chip coupling, as they do not provide high-density connectivity or scalable manufacturing as needed for coupling of optical fibers to integrated devices. However, a beam-turning assembly is disclosed herein for high-density connectivity that includes a polarizing beam-splitter that is suitable for use in an optical fiber-to-chip coupler.

It is noted that in many applications, on-chip devices and waveguides may operate with both polarizations, allowing, for example, two separate communication channels. In such cases, the invention disclosed herein could be used to transmit signals with two separate polarizations, via two separate optical grating couplers, to the same output optical fiber, thus enhancing system capacity with comparable packaging costs.

FIG. 1A shows an example beam-turning assembly 100, in accordance with some embodiments of the present invention. The beam-turning assembly 100 includes an end-cap 101 attached to an optical fiber 103. The end-cap 101 has an angled face 105. A multilayer stack 107 is attached to the angled face 105. It should be understood that in some embodiments, the beam-turning assembly 100 can be configured for use with multiple optical fibers 103, such as with a multiple optical fiber ribbon, where each optical fiber has its own end-cap 101 and its own multilayer stack 107. The multilayer stack 107 includes a first reflecting region 109 and a second reflecting region 111. Light propagating along the core axis 121 of the optical fiber 103 reflects off of the first reflecting region 109 to form a first reflected beam 113, and reflects off of the second reflecting region 111 to form a second reflected beam 115. More specifically, the multi-layer stack 107 includes the first reflecting region 109 designed to selectively reflect one polarization of light while transmitting light of another polarization. In some embodiments, the first reflecting region is formed as a multilayer stack of alternating layers of materials. By way of example, such a polarization-sensitive reflector can be achieved using a Bragg reflector angled approximately at the Brewster condition, according to principles outlined in "Modified MacNeille cube polarizer for a wide angular field," by Jacques Mouchart, et al., Applied Optics, Volume 28, No. 14, Jul. 15, 1989 ("Mouchart" hereafter), which is incorporated herein by reference, and "Visible broadband, wide-angle, thin-film multilayer polarizing beam splitter," by Li, et al., Applied Optics, Volume 35, No. 13, May 1, 1996 ("Li" hereafter), which is incorporated herein by reference. In various embodiments, the second reflecting region 111 may include a Bragg reflector or may include a metal layer, and may be polarization-insensitive. The first reflected beam 113 is reflected into an optical grating coupler 123 formed within the chip. The second reflected beam 115 is reflected into an optical grating coupler 125 formed within the chip. In some embodiments, a spatial orientation of layers of materials within the first reflecting region 109 relative to an axis 121 of a core of the optical fiber 103 is set to reflect the first polarization of light emanating from the optical fiber 103 into the first reflected beam 113 at an angle that provides for efficient optical coupling of the first reflected beam 113 to the optical grating coupler 123. Also, in some embodiments, a spatial orientation of one or more layer(s) of material(s) within the second reflecting region 111 relative to an axis 121 of a core of the optical fiber 103 is set to reflect the second polarization of light emanating from the optical fiber 103 into the second reflected beam 115 at an angle that provides for efficient optical coupling of the second reflected beam 115 to the optical grating coupler 125.

Figure 1B:
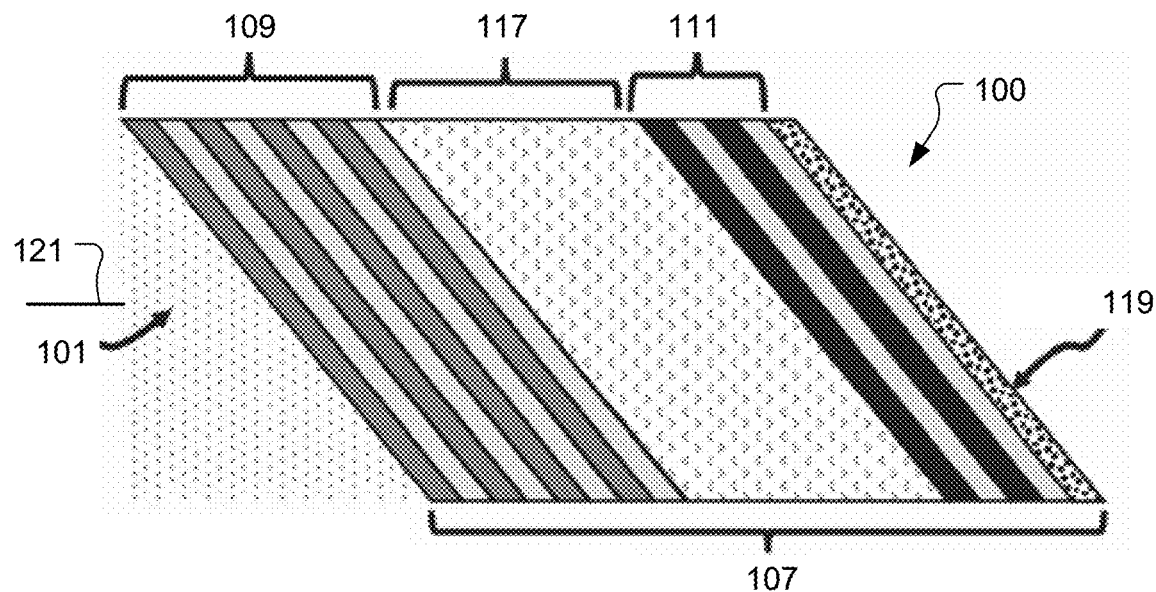
FIG. 1B shows an example structure of the multilayer stack, in accordance with some embodiments of the present invention.

FIG. 1B shows an example structure of the multilayer stack 107, in accordance with some embodiments of the present invention. The multilayer stack 107 includes several layers of material selected to produce the desired reflection and polarization-sensitive properties of the first reflecting region 109 and of the second reflecting region 111. One or more spacer layers 117 may be included in between the first reflecting region 109 and the second reflecting region 111. The thickness of the spacer layer(s) 117 (as measured in a direction parallel to the core axis 121 of the optical fiber 103 at an interface between the optical fiber 103 and the end-cap 101) controls the spacing between the first reflected beam 113 and the second reflected beam 115 (also as measured in the direction parallel to the core axis 121 of the optical fiber 103 at the interface between the optical fiber 103 and the end-cap 101). Also, one or more additional layers can be included to promote mechanical stability. For example, in some embodiments, a protective top layer 119 can be included on a terminal end of the second reflecting region 111. The multilayer stack 107 can be configured such that the angle of the first reflected beam 113 (relative to the incident direction of the beam as transmitted from the optical fiber 103), and the angle of the second reflected beam 115 (relative to the incident direction of the beam as transmitted from the optical fiber 103), and the spacing between the first reflected beam 113 and the second reflected beam 115 (as measured in the direction parallel to the core axis 121 of the optical fiber 103 at the interface between the optical fiber 103 and the end-cap 101), and polarization properties of the first reflected beam 113 and the second reflected beam 115, allow for simultaneous alignment of the first reflected beam 113 and the second reflected beam 115 with a utilization device, where the utilization device may be an optical chip, i.e., photonic chip, by way of example, and where the first reflected beam 113 and the second reflected beam 115 are simultaneously aligned with two optical grating couplers, respectively, on the utilization device, such as with the optical grating couplers 123 and 125, respectively.

Manufacturing processes for making multilayer optical coatings, such as present within the multilayer stack 107, are available and used routinely to produce a variety of high-volume commercial products, including lenses, eyeglasses, and electronic display devices. For example, plasma chemical vapor deposition (PCVD) would be a suitable choice for manufacturing of the multilayer stack 107 since it provides fine control of layer thickness, a wide choice of optical materials, and is compatible with silica substrates. Also, other processes, such as those used to produce laminates, may be used in manufacturing the multilayer stack 107. And, processes for producing optical coatings routinely achieve deep sub-micron thickness control and are capable of precisely defining the spacing between the first reflected beam 113 and the second reflected beam 115 so that it matches the spacing required by a utilization device, e.g., the spacing between a pair of on-chip optical grating couplers. Some examples of manufacturing processes that can be utilized to form the multilayer stack 107 are presented in "Plasma deposition of optical films and coatings: A review," by Ludvik Martinu, et al., Journal of Vacuum Science Technology, A 18(6), November/December 2000, pages 2619-2645 ("Martinu" hereafter), which is incorporated herein by reference.

Figure 2A:
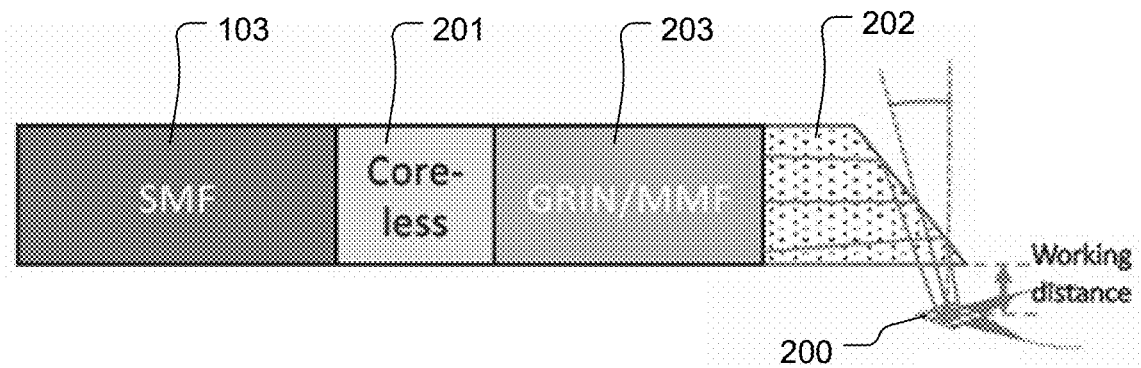
FIG. 2A shows a multi-fiber lensing assembly for use in conjunction with a dual-polarization optical grating coupler on the chip such that the optical fiber assembly accomplishes beam-turning and working-distance adjustment, while the dual-polarization optical grating coupler accomplishes the polarization-splitting, in accordance with some embodiments of the present invention.

The multilayer stack 107 of the present invention is compatible with multi-fiber lensing assemblies, i.e., GRIN assemblies, that include a graded-index section and may include one or more other section(s) of core-less optical fiber, step-index optical fiber, or other optical fiber types, such as described in U.S. Provisional Patent Application No. 62/462,711, which is incorporated herein by reference. FIG. 2A shows a multi-fiber lensing assembly (referred to as GRIN assembly 203) for use in conjunction with a dual-polarization optical grating coupler 200 on the chip such that the optical fiber assembly accomplishes beam-turning and working-distance adjustment (e.g., focusing of the beam on the dual-polarization optical grating coupler 200), while the dual-polarization optical grating coupler 200 accomplishes the polarization-splitting. In the example of FIG. 2A, the optical fiber 103 is connected to an end-cap 202 through a coreless optical fiber 201 and the GRIN assembly 203 to provide lensing of the light beam. It should be understood that use of the GRIN assembly 203 in conjunction with the dual-polarization optical grating coupler 200, as shown in FIG. 2A, provides for polarization-tolerant beam turning.

Figure 2B:
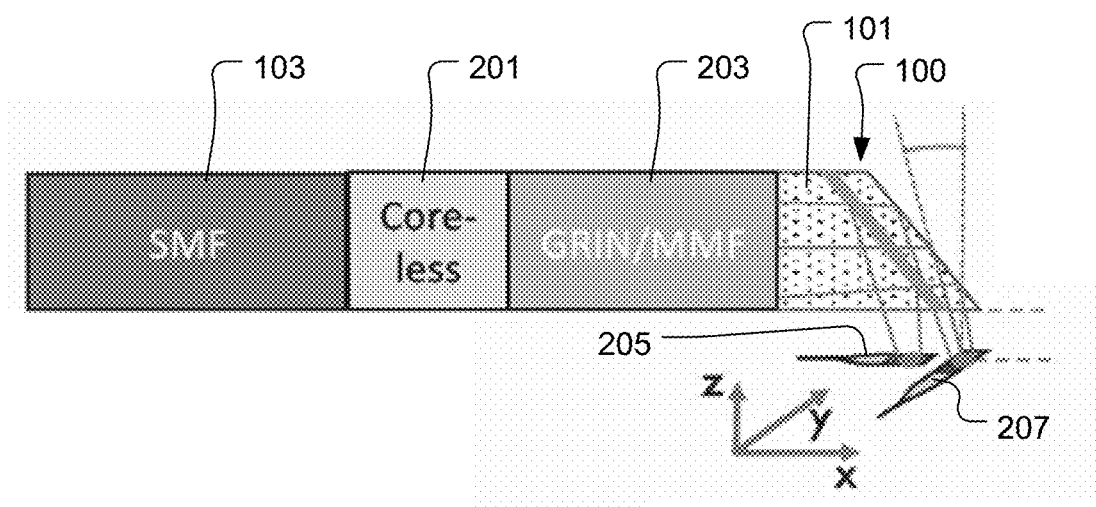
FIG. 2B shows an implementation of the beam-turning assembly with elements of the GRIN assembly of FIG. 2A, in accordance with some embodiments of the present invention.

FIG. 2B shows an implementation of the beam-turning assembly 100 with elements of the GRIN assembly 203 of FIG. 2A, in accordance with some embodiments of the present invention. In the example of FIG. 2B, the optical fiber 103 is connected to the end-cap 101 through a coreless optical fiber 201 and the GRIN assembly 203 to provide lensing of the light beam. The GRIN assembly 203 has a graded index that provides lensing of the light beam. Also, the GRIN assembly 203 can be connected to the optical fiber 103 by one or more coreless optical fiber region(s) 201. In the configuration of FIG. 2B, the beam-turning assembly 100 can perform the functions of polarization-splitting as well as beam-turning (and, optionally, focusing), so that the optical grating couplers 205, 207 on the chip can be single-polarization optical grating couplers. It should be appreciated that this simplifies the optical grating coupler design. In FIG. 2B, the light beams are depicted schematically as converging to indicate an illustrative function of the configuration of FIG. 2B to produce a converging beam with a waist substantially vertically aligned with the utilization device (the utilization device being depicted here as an optical grating coupler). Alternatively, the configuration of FIG. 2B can provide collimation of the light beams. The combination of the beam-turning assembly 100, including the polarization-splitting multilayer stack 107, with the GRIN assembly 203 is compatible with highly desirable features of the GRIN assembly 203. For example, high-quality beams with flexible ability to adjust beam waist size, working distance, and incidence angle can be produced using standard off-the-shelf optical fibers by selecting lengths of optical fiber sections. Also, in this configuration, a mechanically robust and well-aligned optical fiber assembly can be quickly produced using off-the-shelf splicing and cleaving equipment. And, cleaving and splicing is compatible with optical fiber ribbons, allowing scalable and low-cost manufacturing. Moreover, since the optical fiber is positioned flush to the surface of the chip, the combined package including the optical fiber(s), GRIN assembly 203, beam-turning assembly 100, and chip is compact and mechanically robust.

In some embodiments, the multilayer stack 107 may be deposited directly on the optical fiber assembly, using the optical fiber face as a substrate. In these embodiments, the multilayer stack 107 is essentially self-aligning, as no additional alignment or attaching steps are needed. The end-cap 101 in this case can be formed by one of the optical fibers in the optical fiber assembly. In some embodiments, this end-cap 101 optical fiber may be a core-less optical fiber. Alternatively, the multilayer stack 107 can be deposited on an end-cap 101 substrate separately, and this end-cap 101 substrate can be attached to the optical fiber(s) (and/or optical fiber assembly). Attachment of the end-cap 101 substrate after coating requires some alignment in this case, but primarily along a single axis. In some embodiments, an end-cap 101 formed as a single-coated substrate may be attached to multiple optical fibers for scalable manufacturing. In some embodiments, interfaces within the multilayer stack 107 are parallel to the cleave plane in the region of the light beams, i.e., parallel to the angled face 105 of the end-cap 101, and so the first reflected beam 113 and the second reflected beam 115 have the same angle in any layer that they both pass through.

In some embodiments, a space between the optical fiber assembly and the chip is filled with an index-matching material, so the first reflected beam 113 and the second reflected beam 115 see minimal reflection, refraction, and/or distortion at the surface of the optical fiber assembly where they exit toward the optical grating couplers of the chip.

The polarization of the first reflected beam 113 and the second reflected beam 115 incident on the chip is in part a function of how the optical fiber cleave is oriented with respect to the incidence on chip. Therefore, in configuring the optical fiber-to-chip interface, the orientation of the optical fiber cleave is determined to obtain a desired polarization of the first reflected beam 113 and the second reflected beam 115 incident on the chip. Also, there is a related issue of the waveguide direction for each of the two optical grating couplers on the chip, and layout of the optical grating couplers. If the optical grating couplers are close together, waveguides and tapers associated with each optical grating coupler should be directed so as not to impair the other optical grating coupler.

In some embodiments, the first reflected beam 113 will be polarized with its electric field perpendicular to the optical fiber axis 121, and the second reflected beam 115 will be offset from the first reflected beam 113 along the optical fiber axis 121 by a relatively small beam spacing. The corresponding optical grating coupler on the chip will then have a waveguide approximately aligned with the optical fiber axis 121, since incident fields tend to efficiently excite modes propagating in directions nearly perpendicular to the electric field. To avoid layout difficulties, this waveguide will be "counter-propagating" relative to the optical fiber 103 (light traveling along the optical fiber axis 121 will be directed to a waveguide mode propagating in approximately the opposite direction). In some embodiments, the second optical grating coupler for receiving the second reflected beam 115 has a waveguide approximately perpendicular to the waveguide of the first optical grating coupler for receiving the first reflected beam 113. For example, in some embodiments, the waveguide of the second optical grating coupler can be oriented within +/−5 degrees of perpendicular to the waveguide of the first optical grating coupler. Also, in some embodiments, the waveguide of the second optical grating coupler can be oriented within +/−2 degrees of perpendicular to the waveguide of the first optical grating coupler.

Figure 3A:
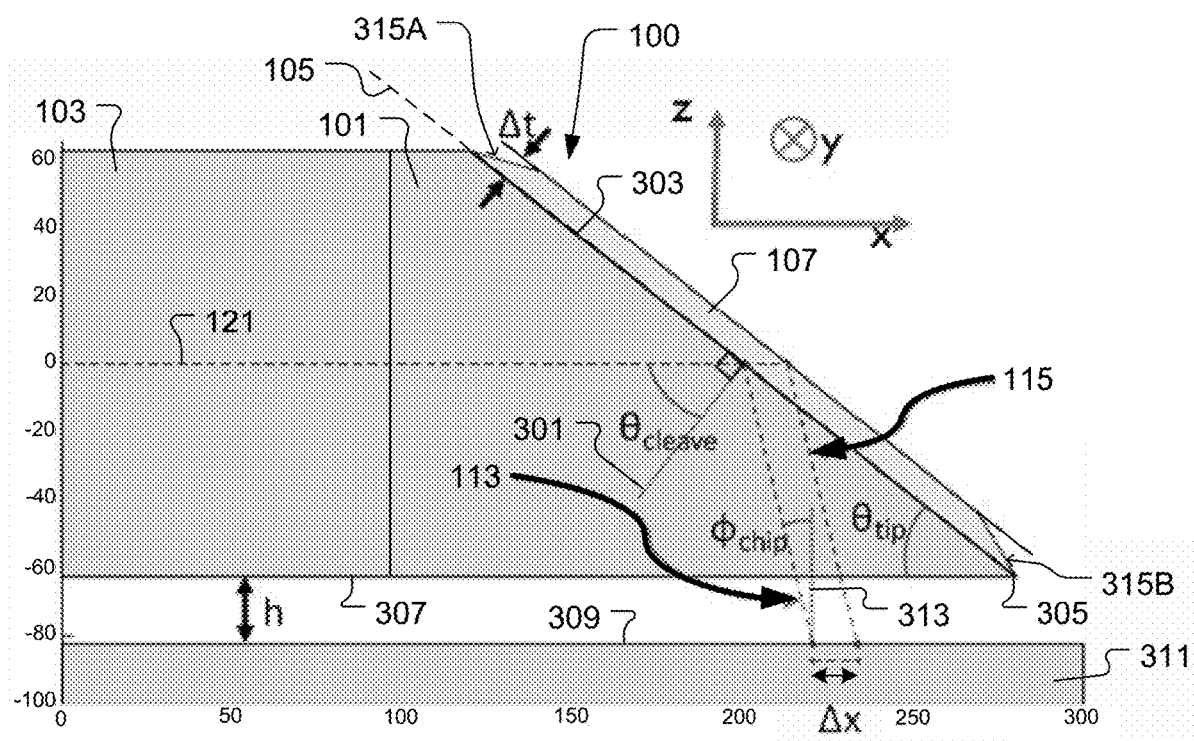
FIG. 3A shows an example of beam propagation for a "centered cleave" configuration of the beam-turning assembly, in accordance with some embodiments of the present invention.

FIG. 3A shows an example of beam propagation for a "centered cleave" configuration of the beam-turning assembly 100, in accordance with some embodiments of the present invention. FIG. 3A is drawn to scale for an illustrative example geometry of the beam-turning assembly 100 using a 125 micrometer diameter optical fiber 103, a 14 degree incidence angle at the chip 311, and a spacing (Δx) of 13 micrometers in the x-direction between the first reflected beam 113 and the second reflected beam 115. In the example of FIG. 3A, the end-cap 101 can be formed by a terminal portion of coreless optical fiber. As shown in FIG. 3A, for a reflected beam separation on the order of 5-20 micrometers, a total thickness (Δt) of the first reflecting region 109 and the second reflecting region 111 and the spacing layer(s) 117 between them can be thin compared to the optical fiber outer diameter. As shown in FIG. 3A, a cleave angle $\theta_{cleave}$ is defined as an angle measured between the optical fiber axis 121 and a vector 301 normal to a cleave plane 303. It should be understood that the cleave plane can be formed by cleaving, i.e., cutting with a blade or laser-cleaver, in some embodiments, but in other embodiments can be formed by polishing or by other techniques. A tip angle of the cleave $\theta_{tip}=(\pi/2)-\theta_{cleave}$ is defined as an angle measured between the optical fiber axis 121 and the cleave plane 303. The tip angle $\theta_{tip}$ is the angle that would be formed by the cleave plane 303 at an idealized tip 305 of the optical fiber 103. It should be understood, however, that the tip 305 of the optical fiber 103 may not have an ideal geometry in practice. The optical fiber 103 is positioned so that an outer surface 307 of the optical fiber 103 is at a height (h) above a chip plane 309, where the chip plane 309 is an outer surface of the chip 311. A beam traveling along the optical fiber axis 121 and reflected by the angled face 105 at the cleave plane 303 will have an incidence angle $\phi_{chip}$ defined as an angle measured between a line of travel of the first reflected beam 113 and a vector 313 normal to the chip plane 309. Also, in some embodiments, the optical fiber axis 121 is oriented parallel to the chip plane 309, so that $\phi_{chip}=2*\theta_{cleave}-(\pi/2)$.

In some embodiments, the multilayer stack 107 is deposited on the angled face 105 of the cleave plane 303 so that in a central portion of the multilayer stack 107 near the optical fiber axis 121, each layer of the multilayer stack 107 has a relatively constant thickness as measured in a direction parallel to the vector 301 normal to the cleave plane 303. And, at positions 315A, 315B away from the optical fiber axis 121, the total thickness (Δt) of the multilayer stack 107 can become less regular. For example, the total thickness (Δt) of the multilayer stack 107 can become thinner at positions farther away from the optical fiber axis 121. A beam traveling down the optical fiber axis 121 has two reflections occurring respectively at the first reflecting region 109 and the second reflecting region 111 within the multilayer stack 107 (see FIGS. 1A, 1B). The first reflected beam 113 and the second reflected beam 115 are separated by the distance Δx as measured in the x-direction parallel to the optical fiber axis 121. The distance Δx is related to the thickness separation Δt as measured in the direction parallel to the vector 301 normal to the cleave plane 303 between the first reflecting region 109 and the second reflecting region 111 of the multilayer stack 107. In some embodiments, a refractive index of the spacer layer(s) 117 between the first reflecting region 109 and the second reflecting region 111 (see FIG. 1B) can be approximated by the refractive index of the optical fiber 103, which corresponds to Δx=Δt/cos($\theta_{cleave}$). For example, if $\phi_{chip}=14$ degrees and a silica (n=1.45) spacer region 117 with thickness Δt≈8 micrometers is disposed between the first reflecting region 109 and the second reflecting region 111 within the multilayer stack 107, a separation (Δx) between the first reflected beam 113 and the second reflected beam 115 at the chip plane 309 is about 13 micrometers. The desired separation (Δx) between the first reflected beam 113 and the second reflected beam 115 at the chip plane 309 depends on the waist diameter of the beam and the optical grating coupler design, among other parameters, and will generally need to be larger than the beam diameter multiplied by a crowding factor in order to avoid excessive losses.

For example, in some embodiments, the beam separation Δx should be greater than the average of the beam widths times a crowding factor of 1.0. The factor 1.0 provides for non-crowding of the optical grating couplers in only a central portion of the beam, and so substantial loss is expected. More preferably, the beam separation Δx should be greater than the average of the beam widths (along the x-direction, if the beams are not circular) times a crowding factor of about 1.7. To further improve the optical grating coupler performance, the beam separation Δx should be greater than the average of the beam widths times a crowding factor of about 2.5, but eventually large spacing may be limited by fabrication of a high-performance multilayer stack 107.

The desired separation (Δx) between the first reflected beam 113 and the second reflected beam 115 at the chip plane 309 will generally need to be larger than the sum of the beam radii of the first reflected beam 113 and the second reflected beam 115 in order to avoid excessive losses. With reference to FIG. 3A, optical fiber axis 121 represents the direction of light propagation along the axis of the optical fiber. It should be understood that the light beam, i.e., light wave, has a non-zero diameter. In other words, the light wave occupies more space than the line corresponding to the optical fiber axis 121. A so-called mode field diameter of the propagating light is between about 8 and about 11 micrometers. This mode field diameter is not negligible given the scale of the drawing, but for clarity of illustration, the light beam is represented as the dashed line corresponding to the optical fiber axis 121. Similarly, the first reflected beam 113 and the second reflected beam 115 are represented as dashed lines transverse to the optical fiber axis 121, but it should be understood that each of the first reflected beam 113 and the second reflected beam 115 has a respective beam waist.

For discussion, consider that the beam waists of the first reflected beam 113 and the second reflected beam 115 are the same size (although this is not always the case). In this case, if the first reflected beam 113 and the second reflected beam 115 are perfectly parallel to each other and are separated from each other by a distance Δx, then the first reflected beam 113 and the second reflected beam 115 will be tangent to each other, when Δx is equal to a diameter of either the first reflected beam 113 or the second reflected beam 115. In general, the first reflected beam 113 and the second reflected beam 115 will be tangent when the sum of their radii is equal to Δx. Now, the first reflected beam 113 and the second reflected beam 115 will have to interact with the optical grating coupler on the chip at their focal point.

In some embodiments, the beam-turning assembly 100 is implemented in conjunction with separate optical grating couplers for TE and TM, respectively. And, in some embodiments, the beam-turning assembly 100 is implemented in conjunction with a single optical grating coupler that has at least two distinct regions for TE and TM, respectively. To maximize the light coupling into the chip, the TE and TM regions on the optical grating coupler need to be substantially separate, i.e., substantially distinct from each other, such that the power in the first reflected beam 113 has minimal overlap with the power in the second reflected beam 115. Also, due to manufacturing variation and/or different reflected beam paths, it is not expected that the first reflected beam 113 and the second reflected beam 115 will be perfectly parallel to each other. Therefore, the distance Δx between the propagation centerlines of the first reflected beam 113 and the second reflected beam 115 should be greater than the sum of the radii of the first reflected beam 113 and the second reflected beam 115.

Figure 3B:
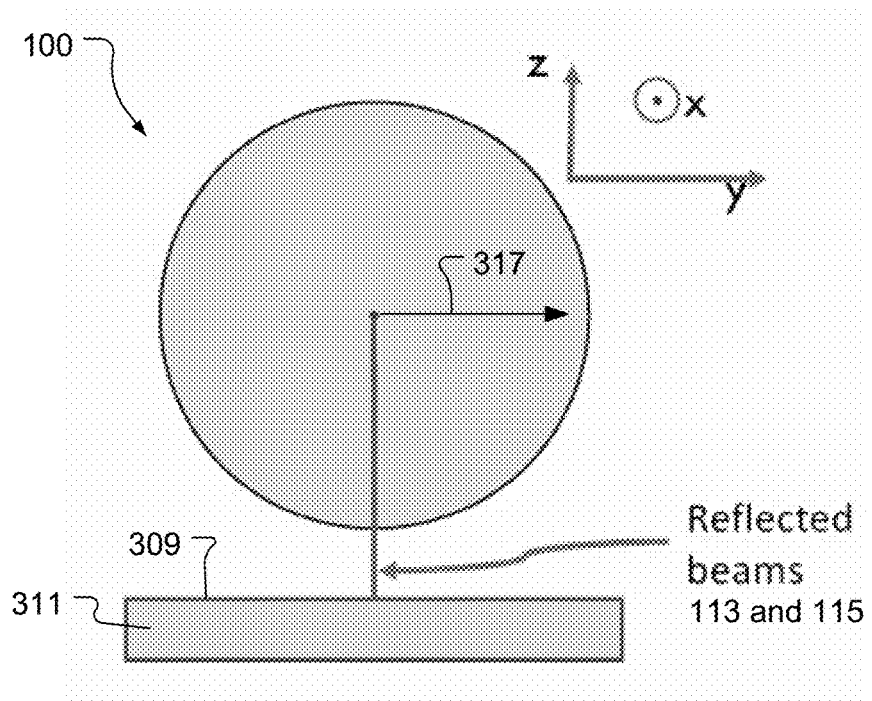
FIG. 3B shows an end view of the configuration of FIG. 3A facing toward the multilayer stack along the x-direction, in accordance with some embodiments of the present invention.

FIG. 3B shows an end view of the configuration of FIG. 3A facing toward the multilayer stack 107 along the x-direction, in accordance with some embodiments of the present invention. In some embodiments, the cleave is "centered" on the chip 311, in the sense that an optical fiber tilt plane coincident with both the optical fiber axis 121 and the vector 301 normal to the cleave plane 303 is perpendicular to the chip plane 309. In this configuration, the optical fiber axis 121 defines the x-direction, and the vector 313 normal to the chip plane 309 defines a z-direction, and a vector 317 that is both perpendicular to the optical fiber axis 121 and parallel to the chip plane 309 defines a y-direction. Also, an intersection between the cleave plane 303 and the chip plane 309 corresponds to a line that is orthogonal to the optical fiber axis 121. This means that, as shown in FIG. 3B, when viewed along the direction of the optical fiber axis 121 (along the x-direction), both the first reflected beam 113 and the second reflected beam 115 will appear to take a perpendicular path towards the chip plane 309, such that neither of the first reflected beam 113 nor the second reflected beam 115 has a directional component along the y-direction.

In the center cleaved configuration, the first reflected beam 113 and the second reflected beam 115 travel in the optical fiber tilt plane. Therefore, a cross-section view of the center cleaved configuration coincident with the optical fiber tilt plane, such as shown in FIG. 3A, shows the incidence angles of the first reflected beam 113 and the second reflected beam 115 with respect to the chip plane 309. In the center cleaved configuration, the polarization "s" and "p" labels are consistent for the chip interface and the cleave interface. That is, the first reflected beam 113 has a polarization with its electric field along the y-direction in-plane (or "s" polarized) at both the cleave plane 303 and the chip plane 309. Therefore, the first optical grating coupler 123 can be considered as "s-polarized." S-polarized optical grating couplers generally follow typical designs such as those discussed in "75% Efficient Wide Bandwidth Grating Couplers in a 45 nm Microelectronics CMOS Process," by Mark T. Wade, et al., Optical Interconnects Conference (OI), 2015 IEEE ("Wade" hereafter), which is incorporated herein by reference. An s-polarized optical grating coupler typically has a waveguide along the same axis as the incident light, projected onto the chip plane 309 (that is, along the x-axis in FIGS. 3A and 3B), although it can either be co-propagating (positive x) or counter-propagating (negative x). In some embodiments, a counter-propagating optical grating coupler is aligned with the first reflected beam 113 of FIG. 3A, so that the spacing (Δx) between the first reflected beam 113 and the second reflected beam 115 can be small, and so that the total thickness (Δt) of the multilayer stack 107 does not need to be large. A counter-propagating s-polarized optical grating coupler 123 aligned with the first reflected beam 113 is depicted schematically in FIG. 1A. In the absence of polarization-rotating elements, the second reflected beam is p-polarized (having its electric field in the x-z plane) with respect to the cleave plane 303 and the chip plane 309. This configuration requires an efficient p-polarized optical grating coupler 125, which is depicted schematically aligned with the second reflected beam 115 in FIG. 1A. A p-polarized optical grating coupler would differ substantially from optical grating couplers discussed thus far, and principles of its design are discussed below. In some embodiments, the p-polarized optical grating coupler has a cross-propagating waveguide, that is, a waveguide at a direction substantially different from the projection of the incident beam on the chip plane 309.

Figure 4A:
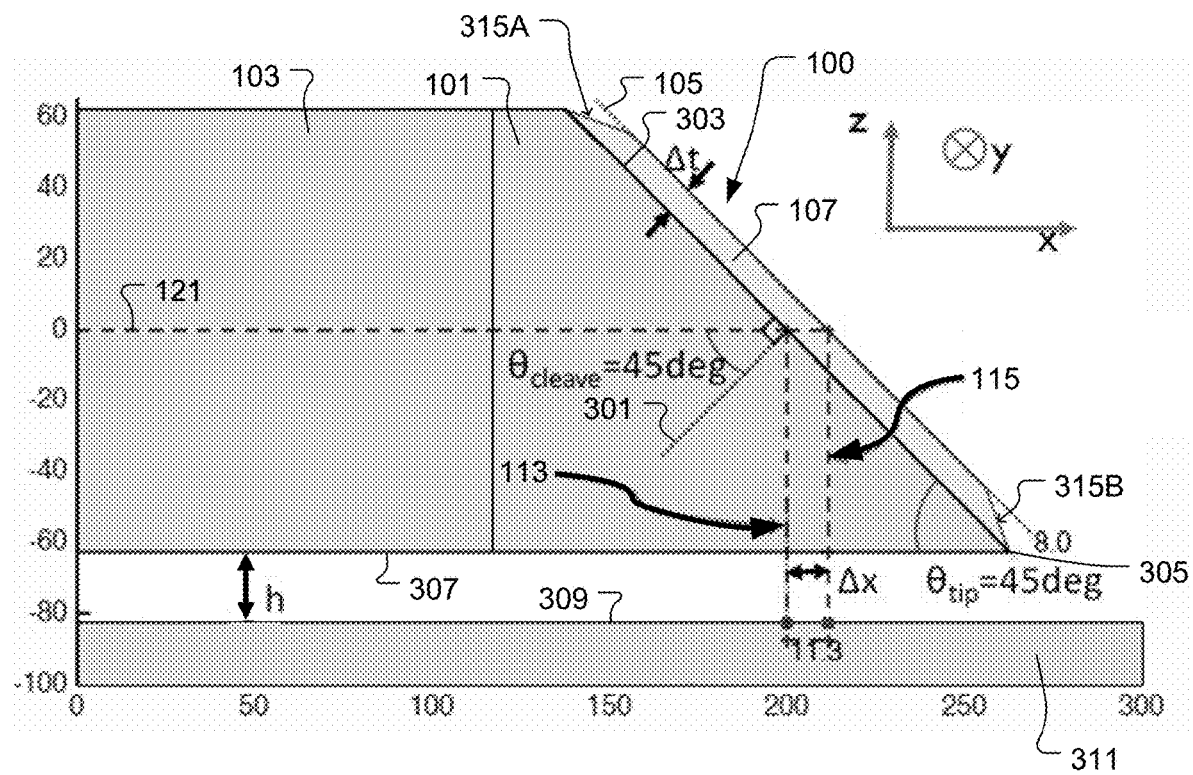
FIG. 4A shows an example of beam propagation for a "skewed cleave" configuration of the beam-turning assembly, in accordance with some embodiments of the present invention.

In some embodiments, the cleave is not centered, but rather "skewed" so that the vector 301 normal to the cleave plane 303 is not in the plane coincident with both the optical fiber axis 121 and the vector 313 normal to the chip plane 309. FIG. 4A shows an example of beam propagation for a "skewed cleave" configuration of the beam-turning assembly 100, in accordance with some embodiments of the present invention. FIG. 4A is drawn to scale for an illustrative example geometry of the beam-turning assembly 100 using a 125 micrometer diameter optical fiber. In the example of FIG. 4A, the end-cap 101 is formed by a terminal portion of a coreless optical fiber. The cleave angle $\Delta_{cleave}$ and tip angle of the cleave $\theta_{tip} = (\pi/2) - \theta_{cleave}$ are defined in the x-z plane, where the x-direction is along the optical fiber axis 121 and the z-direction is normal to the chip plane 309. In the example embodiment of FIG. 4A, $\theta_{cleave} = \theta_{tip} = (\pi/4)$. The outer surface 307 of the optical fiber 103 is positioned at the height (h) above the chip plane 309.

Figure 4B:
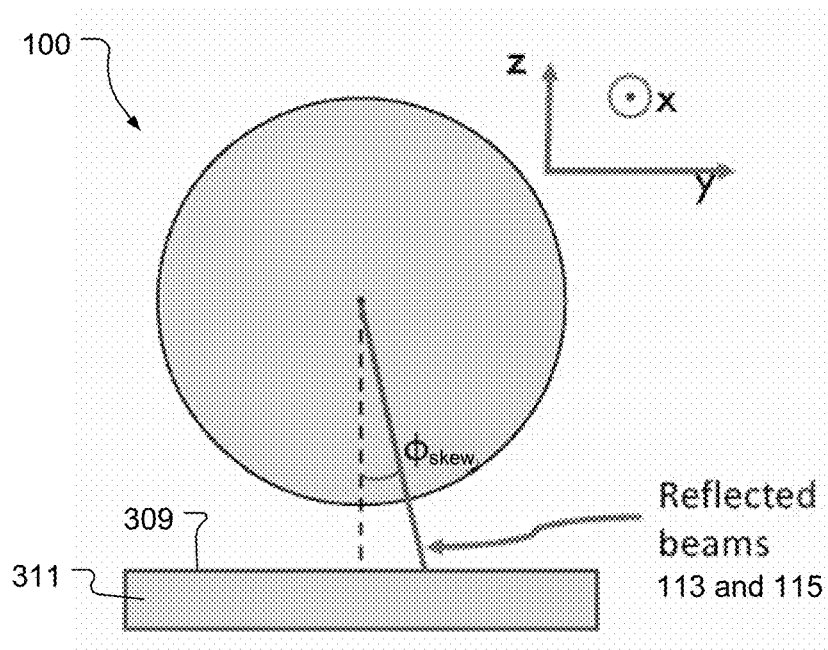
FIG. 4B shows an end view of the configuration of FIG. 4A facing toward the multilayer stack along the x-direction, in accordance with some embodiments of the present invention.

FIG. 4B shows an end view of the configuration of FIG. 4A facing toward the multilayer stack 107 along the x-direction, in accordance with some embodiments of the present invention. FIG. 4B shows that a beam traveling along the optical fiber axis 121 and reflected by the angled face 105 at the cleave plane 303 will be reflected perpendicular to the optical fiber axis 121, but skewed at a skew angle $\theta_{skew}$ towards the y-direction. The incidence angle with the chip $\phi_{chip}$ of the first reflected beam 113 and the second reflected beam 115 is equal to the skew angle $\theta_{skew}$. In the embodiment of FIG. 4A, both the first reflected beam 113 and the second reflected beam 115 are reflected at 90 degrees relative to the optical fiber axis 121. Therefore, incidence of the first reflected beam 113 and the second reflected beam 115 on the chip 311 occurs in the y-z plane. In the skewed cleave configuration, the polarization of the second reflected beam 115 has primarily x-directed electric field, and is thus p-polarized with respect to the cleave plane 303, but is s-polarized with respect to the chip plane 309. Thus, the optical grating coupler aligned with the second reflected beam 115 is of the more typical s-polarized type, and can be either co-propagating or counter-propagating. The first reflected beam 113 now has light p-polarized with respect to the chip plane 309. Therefore, the optical grating coupler aligned with the first reflected beam 113 will be of the p-polarized type.

Figure 5A:
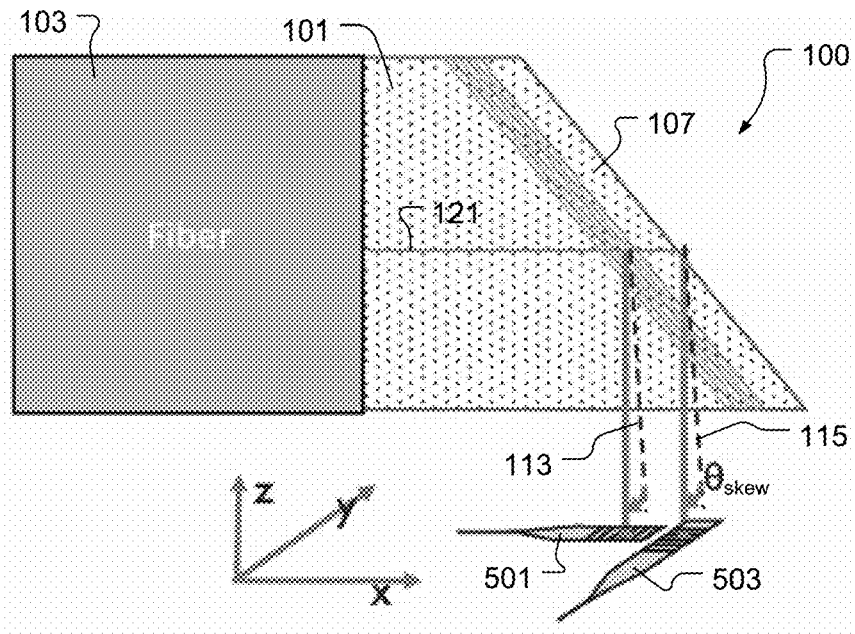
FIG. 5A shows the skewed cleave configuration of FIGS. 4A and 4B with optical grating couplers for optical fiber-to-chip coupling, in accordance with some embodiments of the present invention.

FIG. 5A shows the skewed cleave configuration of FIGS. 4A and 4B with optical grating couplers 501 and 503 for optical fiber-to-chip coupling, in accordance with some embodiments of the present invention. The first reflected beam 113 is directed at a cross-propagating optical grating coupler 501. and a second reflected beam 115 directed at a co-propagating optical grating coupler 503. In other embodiments, the second reflected beam 115 may be directed at a counter-propagating optical grating coupler. Comparing FIGS. 1A and 5A, it should be appreciated that through only a small change in angles, the role of the p-polarized and s-polarized optical grating couplers have been reversed.

In general, the first reflected beam 113 and the second reflected beam 115 may be neither perpendicular to the optical fiber axis 121 (as in the skewed cleave configuration) nor in the plane coincident with both the optical fiber axis 121 and the vector 313 normal to the chip plane 309 (as in the centered cleave configuration). In such a case, the polarizations of the first reflected beam 113 and the second reflected beam 115 will still be orthogonal, but will not be s-polarized or p-polarized with respect to the incidence of the beam on the chip plane 309. Both optical grating couplers on the chip 311 will then have waveguides that are not aligned with the projection of the incident beam on the chip plane 309. In some embodiments, each optical grating coupler has a taper or waveguide along a direction approximately perpendicular to the electric field of the incident light. The geometry of the optical grating coupler is thus matched to the incident light's polarization even when this polarization is neither "s" nor "p."

In some embodiments, the cleave angle can be defined to produce the first reflected beam 113 and the second reflected beam 115 whose polarizations at the chip plane 309 have the same angle of separation between the vector 313 normal to the chip plane 309 and the electric field direction. Configuration of the beam-turning assembly 100 with this cleave angle are referred to as a "balanced cleave" configuration. In the balanced cleave configuration, both optical grating couplers exhibit a similar degree of symmetry-breaking, which may tend to produce excess loss of light. This will correspondingly tend to produce lower polarization dependent loss, and may allow more equivalent optical grating coupler designs to be used for both optical grating couplers in a pair.

The condition for a balanced cleave configuration is related to the propagation direction after reflection $\hat{k}_R$ as $$|\hat{z} \cdot \vec{s}| = |\hat{z} \cdot [\vec{s} \times \hat{k}_R]|,$$

where the electric field direction of s-polarizations $\vec{s}$ is determined by the cleave normal $\hat{n}$ and propagation direction $\hat{k}_{in}$ of light before reflection as follows, $$\vec{s} = \hat{n} \times \hat{k}_{in}.$$

We can derive from this a relationship between the angles defining the cleave normal as follows, $$\sin(\theta_c)\sin(\phi_c) \approx \pm \cos(\phi_c)[2\cos^2(\theta_c)\sin^2(\phi_c)-1]$$

where $\phi_c$ is the angle between the cleave normal 301 and the chip normal 313, and $\theta_c$ is the azimuthal orientation of the cleave normal 301 in the chip plane 309 relative to the optical fiber axis 121.

In some embodiments of the balanced cleave configuration, the first reflected beam 113 and the second reflected beam 115 have a propagation direction that projects onto the chip 311 at close to 45 degrees from the optical fiber axis 121, that is, if $\hat{x}$ is the optical fiber axis 121, $\hat{z}$ is the chip normal 313 and $\hat{y} = \hat{z} \times \hat{x}$, which gives the following relationship, $$|\hat{k}_R \cdot \hat{x}| \approx |\hat{k}_R \cdot \hat{y}|.$$

Figure 5B:
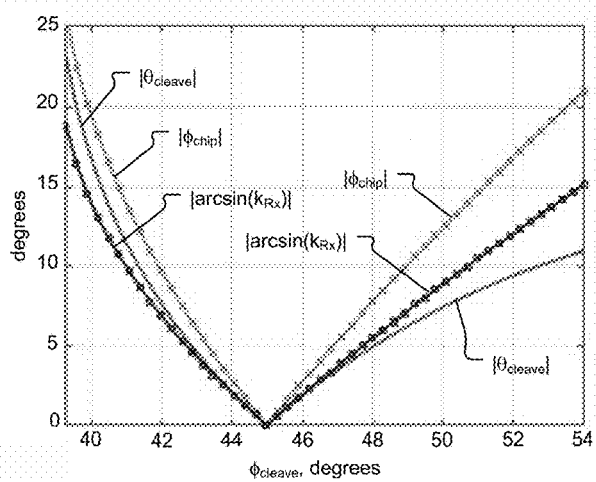
FIGS. 5B and 5C show plots of an implementation of the relationship $\vec{s} = \hat{n} \times \hat{k}_{in}$ related to the balanced cleave configuration of the beam-turning assembly, in accordance with some embodiments of the present invention.
Figure 5C:
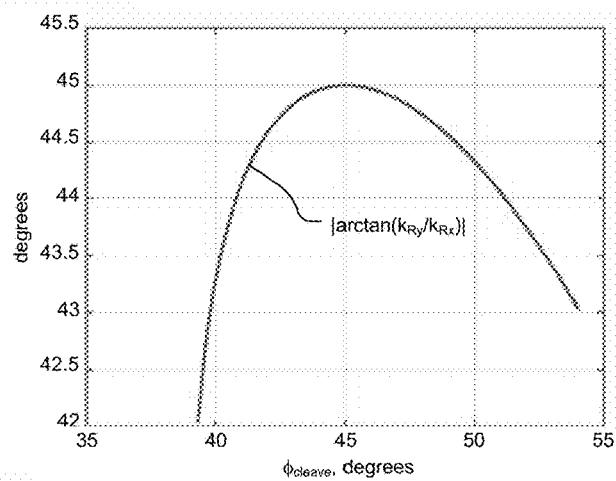

FIGS. 5B and 5C show plots of an implementation of the relationship $\vec{s} = \hat{n} \times \hat{k}_{in}$ related to the balanced cleave configuration of the beam-turning assembly 100, in accordance with some embodiments of the present invention. As shown in FIG. 5B, in order to achieve a preferred range 5 deg<$\phi_{chip}$<25 deg of incidence angles on the chip, we should use a range of cleave angles 39 deg<$\phi_{cleave}$<44 deg with $\theta_{cleave}$ slightly less than $\phi_{chip}$. In some embodiments, the cleave angles are within the range 40 deg<$\phi_{cleave}$<43 deg. In some embodiments, cleave angles within the range 46 deg<$\phi_{cleave}$<54 deg also provide a similar range 5 deg<$\phi_{chip}$<25 deg of incidence angles, with $\theta_{chip}-\theta_{cleave}$ in the range from about 2 degrees to about 10 degrees. FIG. 5C indicates that a range of arctan($k_{Ry}/k_{Rx}$) extends from about 42 degrees to about 45 degrees, where the x-direction and the y-direction are orthogonal directions in the chip plane 309 and the x-direction is the direction of the optical fiber axis 121 projected onto the chip plane 309.

Figure 6A:
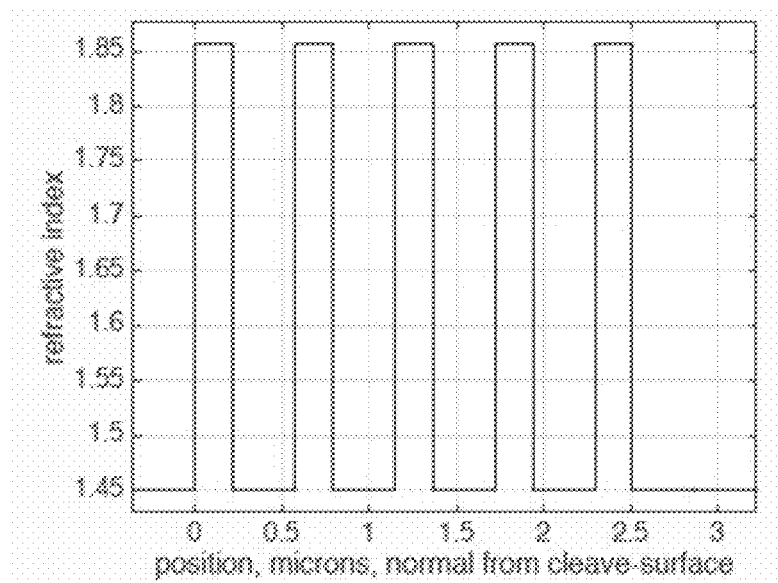
FIG. 6A shows an example configuration of the first reflecting region for the center cleaved configuration, in accordance with some embodiments of the present invention.

FIG. 6A shows an example configuration of the first reflecting region 109 for the center cleaved configuration, in accordance with some embodiments of the present invention. The first reflecting region 109 of the multilayer stack 107 should provide highly polarization-sensitive reflections. It can be designed utilizing the Bragg condition so that the p-polarization does not reflect off of any of the interfaces. In some embodiments that use a two material stack, it is possible to index-match the low-index material to the end-cap 101 material, e.g., $n_{lo}$=1.45. The angle in the low-index material is chosen to match the desired incidence angle on the chip: $2\theta_{lo}$-90 degrees=$\phi_{chip}$ (e.g., $\phi_{chip}$=14 degrees). The Brewster condition is then $\tan(\theta_{lo})=n_{hi}/n_{lo}$, e.g., $n_{hi}$=1.86. Thicknesses can be selected by the quarter-wave rule: thickness$_k=\lambda/(4 n_k \cos(\theta_k))$. In this case, using the parameters above, each pair is 0.57 microns thick, so 5 pairs have a combined thickness of about 3 micrometers, as shown in the plot of refractive index versus position of FIG. 6A. Also, in some embodiments, thicknesses can be tailored for improved angular sensitivity (see Mouchart).

Figure 6B:
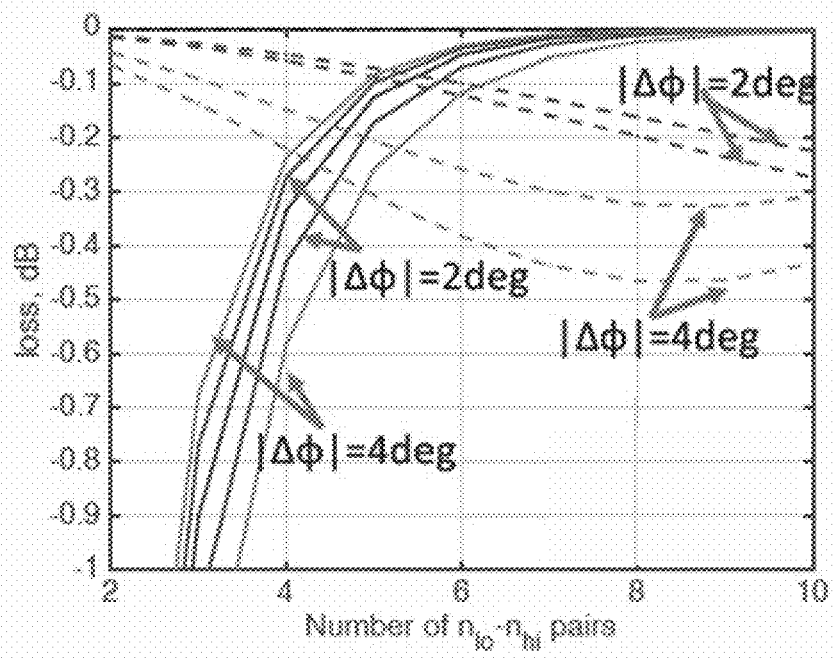
FIG. 6B shows a nominal response of a quarter-wave stack and angular sensitivity for the example configuration of the first reflecting region of FIG. 6A, in accordance with some embodiments of the present invention.

FIG. 6B shows a nominal response of a quarter-wave stack and angular sensitivity for the example configuration of the first reflecting region 109 of FIG. 6A, in accordance with some embodiments of the present invention. In FIG. 6B, solid lines show the fraction of s-polarized light that reflects off of the polarization dependent reflector (PDR), plotted as loss in dB. It should be understood that the multilayer stack 107 is an example of a PDR, in that TM and TE waves will reflect off of the multilayer stack 107 differently. The solid lines indicate the imperfect reflection of s-polarized light (which approaches 0 dB loss as the number of layers is increased). Also, in FIG. 6B, dashed lines show the fraction of p-polarized light that passes through the PDR, plotted as loss in dB. The dashed lines show the imperfect transmission of the p-polarized light, both expressed as loss in dB. The calculated losses are compared for plane waves with two levels of angular misalignment (2 degrees and 4 degrees). An optical fiber mode will have an angular spread of about 4 degrees. Therefore, it is desirable for the maximum loss to be as low as possible. In some embodiments, the first reflecting region 109 can be configured to have low loss for all angles within 4 degrees of the ideal angle. As shown in FIG. 6B, 5 pairs give a maximum loss of about 0.3 dB for both polarizations and all angles within 4 degrees, demonstrating a suitable design.

Figure 7A:
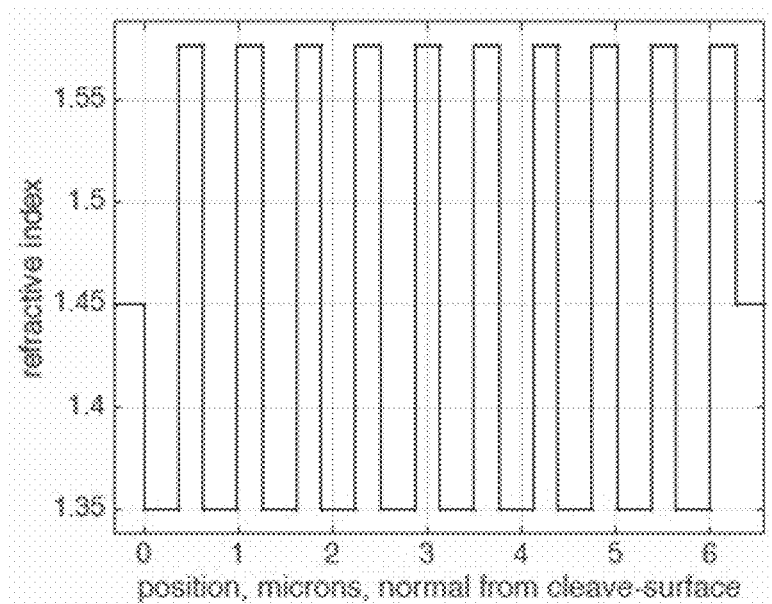
FIG. 7A shows an example configuration of the first reflecting region for the skewed cleave configuration, in accordance with some embodiments of the present invention.
Figure 7B:
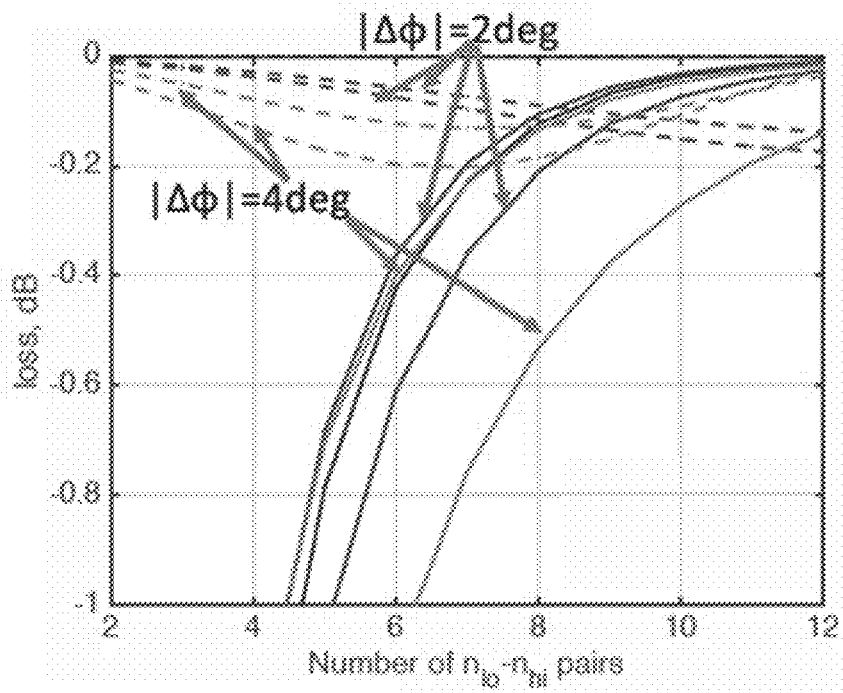
FIG. 7B shows a nominal response of a quarter-wave stack and angular sensitivity for the example configuration of the first reflecting region of FIG. 7A, in accordance with some embodiments of the present invention.

FIGS. 7A and 7B shows that a low-loss polarizing beam splitter can be achieved to meet the requirements of the skewed cleave configuration. FIG. 7A shows an example configuration of the first reflecting region 109 for the skewed cleave configuration, in accordance with some embodiments of the present invention. FIG. 7A shows an example configuration of the first reflecting region 109 compatible with the skewed cleave arrangement of FIGS. 4A, 4B, 5A, 5B, and 5C. In the first reflecting region 109 configuration of FIG. 7A, an initial layer is defined to have: $n_{sil}$=1.45, $\theta_{sil}$=45 degrees. To achieve a compact Bragg reflector, a low-index material with strong contrast relative to silica is used, e.g., one of the lowest routinely used in multi-layer coatings is $MgF_2$, $n_{lo}$=1.35. From formulas in Mouchart, the following is derived:

$$n_{hi}=n_{lo}/\text{sqrt}(2n_{lo}^2/n_{sil}^2-1), \text{ e.g., } n_{lo}=1.35,$$
$$n_{sil}=1.45 \rightarrow n_{hi}=1.58.$$

The Brewster formulas give $\tan(\theta_{lo})=n_{hi}/n_{lo} \rightarrow \theta_{lo}=49$ degrees; $\tan(\theta_{hi})=n_{lo}/n_{hi} \rightarrow \theta_{hi}=41$ degrees. Also, thicknesses can be selected by the quarter-wave rule, $\text{thickness}_k=\lambda/(4 n_k \cos(\theta_k))$, as for the present calculation. In an example embodiment, each pair is 0.63 micrometers thick, so a 10-pair reflecting portion of the stack would have a combined thickness of about 6.3 micrometers. This example 10-pair design is shown as refractive index versus position (from the cleave surface) in FIG. 7A. Also, in some embodiments, the first reflecting region 109 can be configured for improved angular sensitivity, by following Mouchart.

FIG. 7B shows a nominal response of a quarter-wave stack and angular sensitivity for the example configuration of the first reflecting region 109 of FIG. 7A, in accordance with some embodiments of the present invention. In FIG. 7B, solid lines show the fraction of s-polarized light that reflects off of the PDR, plotted as loss in dB. Also, in FIG. 7B, dashed lines show the fraction of p-polarized light that passes through the PDR, plotted as a loss in dB. An optical fiber mode will have an angular spread of about 4 degrees. Therefore, it is desirable for the maximum loss to be as low as possible. FIG. 7B shows that about 10 pairs give a maximum loss of about 0.3 dB for both polarizations and all angles within 4 degrees. In the case of 45 degree incidence in silica, given that the index contrast between silica and available low-index materials is limited, there is a tradeoff between the number of pairs, the loss, and the thickness required. Greater thickness may require longer fabrication time, cost, and non-uniformity in the layers. According to this example of FIG. 7B, the stack should have at least 7 pairs to avoid large losses, but would show improved losses with an increasing number of pairs up to around 11 pairs.

Optical grating couplers of either s-polarized or p-polarized types can be either non-diffractive or diffractive. Diffractive optical grating couplers are compatible with compact layout, and utilize diffractive tapers. Non-diffractive optical grating couplers are generally less compact, requiring substantially adiabatic tapers for low loss.

In some embodiments, the first reflecting region 109 defined as a first polarization-splitting reflector can be combined with a second beam-turning element different from the second reflector region 111. For example, the second beam-turning element may include a bent optical fiber, such as those discussed in "90°-bent with R=1 mm optical fiber technique for optical interconnection" by M. Morimoto, et al., Proceedings of SPIE, the International Society for Optical Engineering, Vol. 6891, 68910E-1, Society of Photo-Optical Instrumentation Engineers, 2008 ("Morimoto" hereafter), which is incorporated herein by reference. The second beam-turning element may undergo thermal stress-relaxation and may be packaged with features to facilitate alignment. Also, the second beam-turning element can be optical fiber-ribbon compatible.

A difference can exist between thin and thick configurations of the multilayer stack 107 with regard to the path of the second reflected beam 115 after reflection by the second reflecting region 111. Specifically, for multilayer stack 107 configurations that are thin, the second reflected beam 115 will pass through the first reflecting region 113 on its way to the chip plane 309. In contrast, for multilayer stack 107 configurations that are thick, the second reflected beam 115 will miss the first reflecting region 113 on its way to the chip plane 309. Thus, the total beam path from optical fiber to chip for the second reflected beam 115 either passes through the first reflecting region 113 twice (if the multilayer stack 107 is sufficiently thin) or once (if the multilayer stack 107 is sufficiently thick). In an ideal geometry, the second reflected beam 115 passes through each material of the first reflecting region 109 at the same angles that the first reflected beam 113 passes through those same materials of the first reflecting region 109. If the single-pass losses of the p-polarization are sufficiently low, double-pass losses should be acceptable. However, it is desirable in some cases to avoid the losses associated with a second pass, thus adopting a thick spacing, i.e., thick spacer layer(s) 117 between the first reflecting region 109 and the second reflecting region 111.

The deposited multilayer stack 107 may have significant imperfections far off of the optical fiber axis 121, and so it may be desirable to have light only pass through the "inner" region of the multilayer stack 107 close the optical fiber axis 121. For the purpose of minimizing edge effects, it would be desirable to have the total deposited thickness of the multilayer stack 107 much less than the radius of the optical fiber 103. And, in this case, a thin (double-pass) regime of the multilayer stack 107 may be used.

Figure 8:
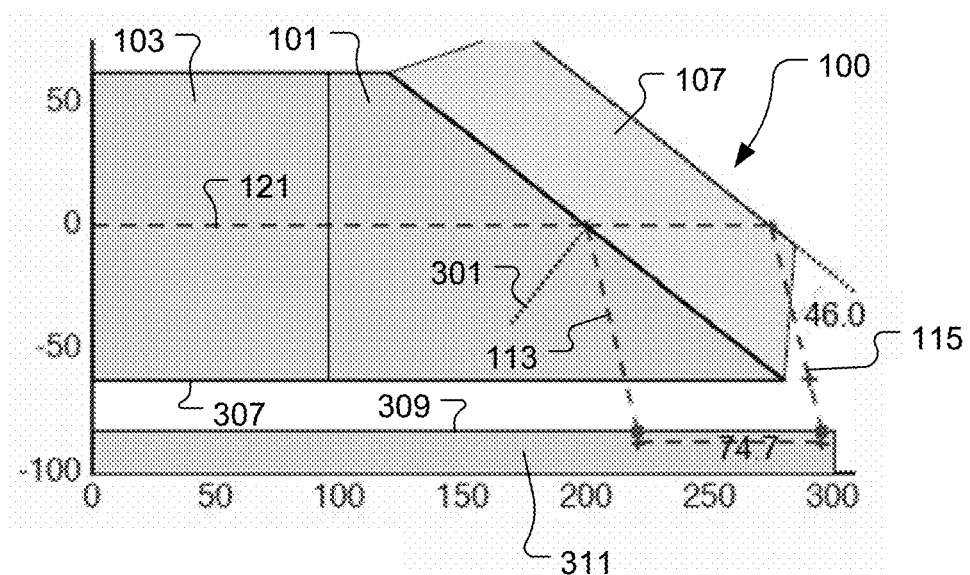
FIG. 8 shows an example of the multilayer stack having a large overall thickness, in accordance with some embodiments of the present invention.

FIG. 8 shows an example of the multilayer stack 107 having a large overall thickness, in accordance with some embodiments of the present invention. In the beam-turning assembly 100 configuration of FIG. 8, the first reflected beam 113 will have a large separation from the second reflected beam 115. With the thick multilayer stack 107, the second reflected beam 115 does not make a second pass through the first reflecting region 109. Instead, the second reflecting beam 115 passes through the side interface of the multilayer stack 107, and specifically of the spacer layer(s) 117 between the first reflecting region 109 and the second reflecting region 111. In an example embodiment, with the optical fiber 103 having a radius of about 62.5 micrometers, the overall thickness of the spacer region(s) 117 (between the first reflecting region 109 and the second reflecting region 111) would need to be greater than about 40 micrometers to avoid a second pass of the second reflected beam 115 through the first reflecting region 109. In this example, the beam will likely pass through a portion of the deposited material with significant non-planarity or other edge effects, and will pass through a deposited edge surface which may have roughness or otherwise be imperfect. This may lead to loss, cross-talk or other non-ideal effects. The deposited spacer region(s) 117 could form a crowned region whose curvature provides focusing and a shift in angle (or other phase transformation) of the beam upon reflection. The large spacing between the first reflected beam 113 and the second reflected beam 115 achieved in the case of a thick multilayer stack 107 allows a less constrained layout of the optical grating couplers. For example, in the case of a thick multilayer stack 107, coupling the first reflected beam 113 to a co-propagating optical grating coupler may be acceptable if the spacing between the first reflected beam 113 and the second reflected beam 115 allows room for the optical grating coupler, taper, and waveguide routing.

Figure 9A:
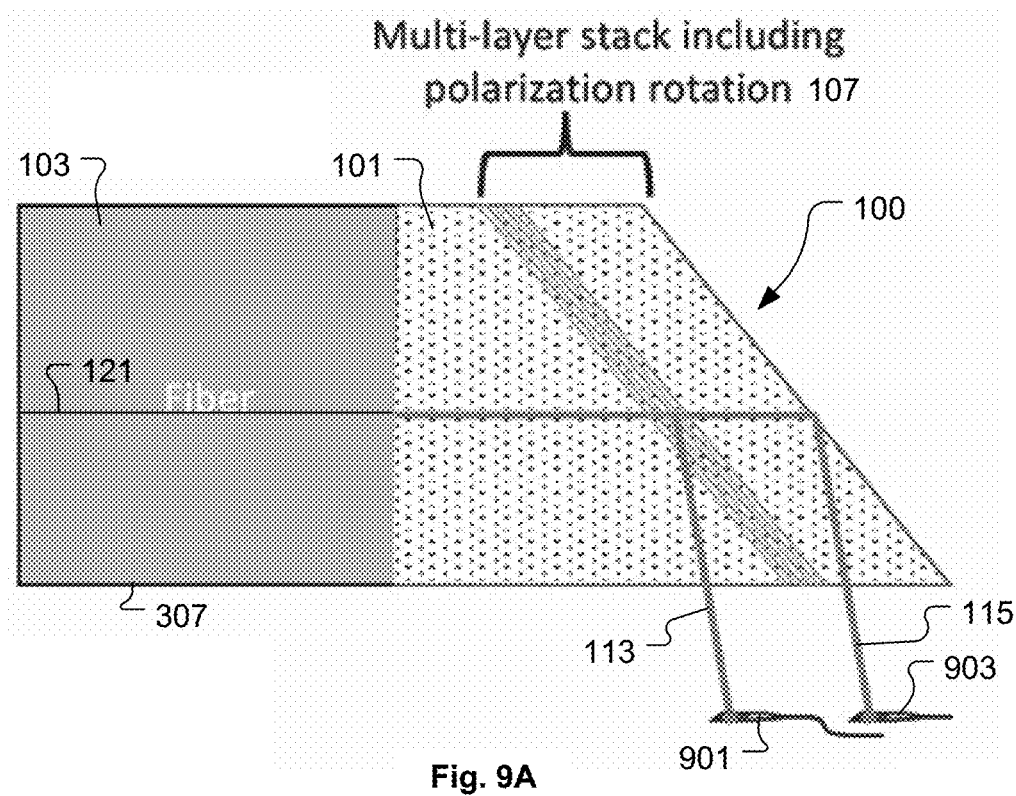
FIG. 9A shows how both the first reflected beam and the second reflected beam can be made incident with s-polarization at the chip plane, and thereby utilize s-polarized optical grating couplers, in accordance with some embodiments of the present invention.
Figure 9B:
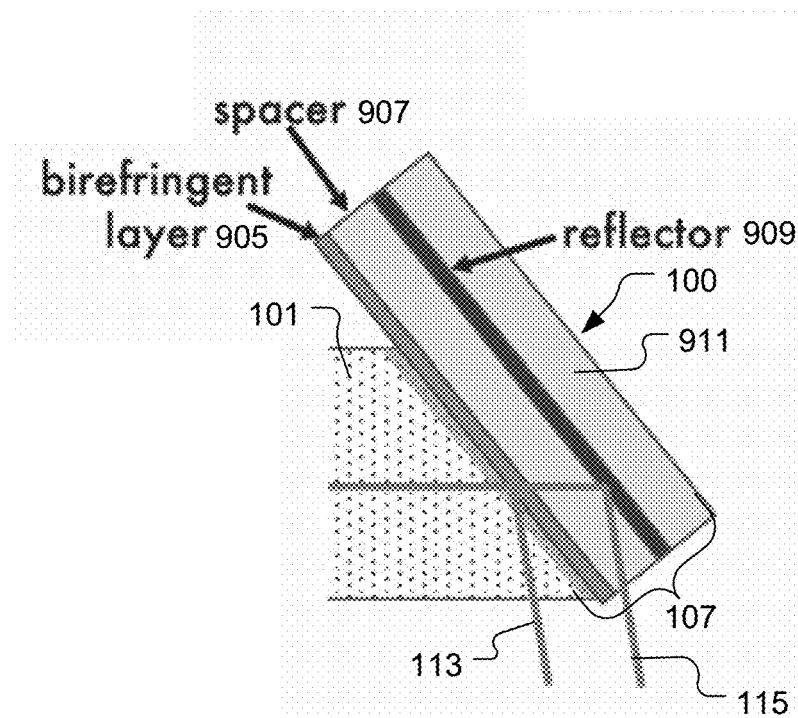
FIG. 9B shows that the multilayer stack can combine layers deposited directly on the cleave face, such as the layers of the first reflecting region, as well as sub-assemblies produced separately and attached to the optical fiber assembly, in accordance with some embodiments of the present invention.

FIGS. 9A and 9B show a configuration of the beam-turning assembly 100 in which the beam-turning assembly 100 splits two polarizations and rotates one of the polarizations so that the first reflected beam 113 and the second reflected beam 115 have substantially the same polarization, in accordance with some embodiments of the present invention. FIG. 9A shows how both the first reflected beam 113 and the second reflected beam 115 can be made incident with s-polarization at the chip plane 309, and thereby utilize s-polarized optical grating couplers 901 and 903, respectively, in accordance with some embodiments of the present invention. FIG. 9B shows that the multilayer stack 107 can combine layers deposited directly on the cleave face, such as the layers of the first reflecting region 109, as well as sub-assemblies produced separately and attached to the optical fiber assembly, in accordance with some embodiments of the present invention. This may provide additional flexibility needed to define the axis of birefringence in a low-cost manufacturing process.

In some embodiments, the first reflecting region 109 and the second reflecting region 111 are separated by a relatively large gap, and this gap performs a polarization-rotation, such that both the first reflected beam 113 and the second reflected beam 115 are substantially the same polarization when incident on the chip. If both the first reflected beam 113 and the second reflected beam 115 have s-polarization, then high-performance s-polarized optical grating couplers can be used, which may result in improved optical grating coupler coupling efficiency. This configuration is shown schematically in FIGS. 9A and 9B. The required polarization rotation is that of a conventional half-wave plate, and could be accomplished with a layer of birefringent material 905 in between the first reflecting region 109 and the second reflecting region 111. The birefringent layer can be configured so that p-polarized light is decomposed into two equal components with different phase velocities in the material. The second reflected beam 115 leaving the birefringent layer is rotated to the orthogonal s-polarization when the two components accumulate a total phase difference of 180 degrees (when the sign of one component is reversed relative to the other component). For example, in some embodiments, the birefringent layers can include a linear birefringent material with birefringent axes in the cleave plane but at 45 degrees to the s-polarized electric field vector. Also, in some embodiments, a material with circular birefringence can be used. FIG. 9B shows an example in which the second reflected beam 115 does not pass through the birefringent region 905, so that only the polarization rotation of a single pass through the material before reflection need be considered. Alternatively, in some embodiments, the second reflected beam 115 may pass through the birefringent material 905 both before and after reflection, in which case the polarization transformation of both passes should be taken into account in the design of the birefringent layer 905.

The need for birefringence that splits the s-polarization into equal components can complicate the fabrication of the multilayer stack 107. If birefringent layers are deposited using PCVD, a means for defining a birefringence axis should be included in the process, such as poling with electrical fields. In this scenario, the birefringent layers will simply be layers in a collection of deposited layers, such as is schematically shown in FIG. 9A and FIG. 8, although birefringent layers are not explicitly indicated in those figures. If a birefringent polymer is deposited, a birefringent axis may be defined through strain of the material. Alternatively, laminates with in-plane birefringence can be used, and such laminates are commercially available and mass-produced for electronic displays. The birefringent material may include a polycarbonate layer. The birefringence may be produced during an extrusion process, with the axis of birefringence defined by the extrusion geometry.

FIG. 9B shows that the multilayer stack 107 structure can include a layered structure that is fabricated and then attached to the optical fiber assembly. This layered structure can contain the birefringent layer 905, and may also include a spacer 907, one or more reflector layers 909, protective layers 911, etc. If the birefringent layer 905 achieves a suitable spacing, then the spacer layer 907 distinct from the birefringent layer 905 may not be needed. Adhesives may be used to attach/form the layered structure of the multilayer stack 107. Or, the layered structure of the multilayer stack 107 may be attached/formed by other means such as heating. Also, the layered structure of the multilayer stack 107 may be a tape. The layered structure of the multilayer stack 107 may be attached once to an optical fiber assembly having multiple optical fibers.

The beam-turning assembly 100 for splitting polarizations and directing the two polarized beams to a utilization device at a well-controlled spacing has been discussed here primarily in terms of an optical fiber-to-chip scenario, where high-density of connectivity and scalable manufacturing are beneficial. It should be appreciated that similar benefits of the beam-turning assembly 100 can be realized for other utilization devices. For example, an optical fiber-ribbon polarizing beam-splitter assembly can utilize any of the beam-turning assemblies 100 described herein, and perform the function of polarization multiplexing in which light from an array (or two ribbons) of polarization maintaining optical fibers would be multiplexed into an array (or a single ribbon) of non-polarization-maintaining optical fiber in a compact way. The beam-turning assemblies 100 can also be used in imaging systems.

In some embodiments, an optical grating coupler can be configured to have a negative tilt angle (counter-propagating waveguide and beam), following principles similar to the design of co-propagating optical grating couplers. In order to direct the light somewhat back along its path, the optical grating coupler should have a larger $k_x$ component, and thus a shorter pitch.

Figure 10A:
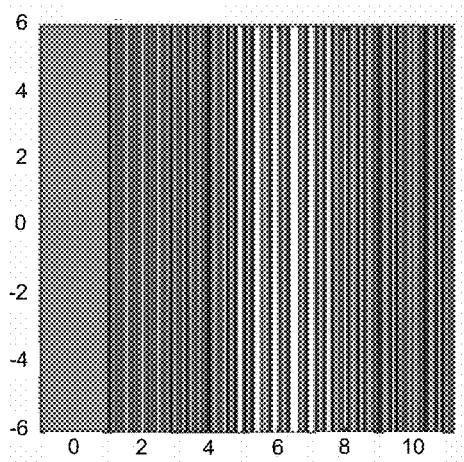
FIG. 10A shows a geometry of the non-diffractive optical grating coupler, in accordance with some embodiments of the present invention.
Figure 10B:
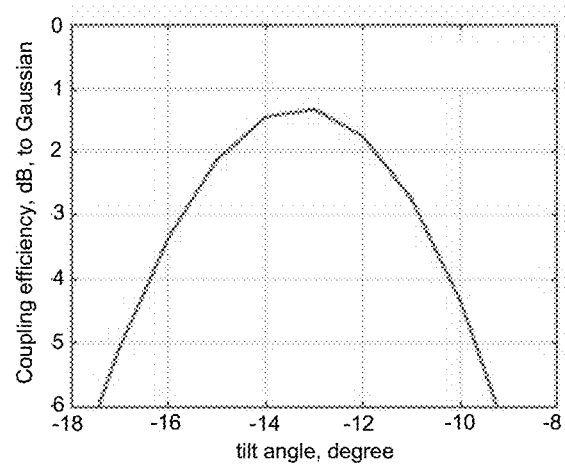
FIG. 10B shows simulated coupling efficiency for the geometry of FIG. 10A, in accordance with some embodiments of the present invention.
Figure 10C:
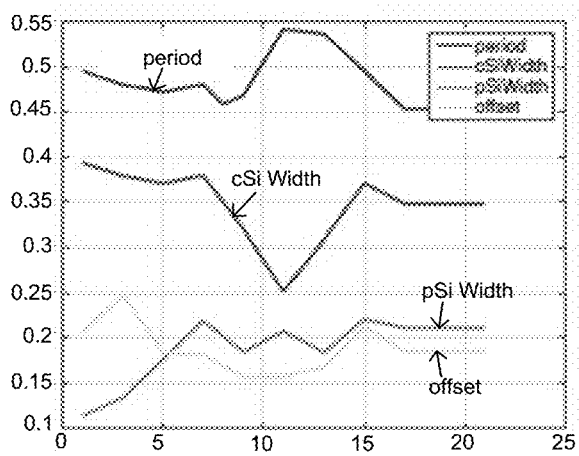
FIG. 10C shows the widths, period, and offsets of the optical grating coupler elements of the geometry of FIG. 10A, in accordance with some embodiments of the present invention.
Figure 10D:
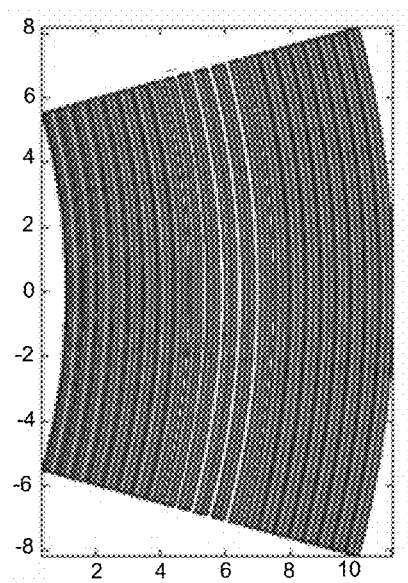
FIG. 10D shows a geometry of the diffractive optical grating coupler, in accordance with some embodiments of the present invention.
Figure 10E:
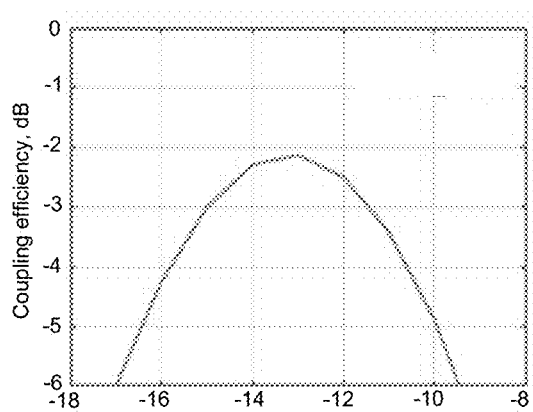
FIG. 10E shows simulated coupling efficiency for the geometry of FIG. 10D, in accordance with some embodiments of the present invention.

FIGS. 10A-10E show example configurations and analysis of efficient counter-propagating optical grating couplers of both the diffracting and non-diffracting types, in accordance with some embodiments of the present invention. More specifically, FIGS. 10A-10E show design calculations using finite-difference time-domain (FDTD) simulation of counter-propagating optical grating couplers for non-diffractive and diffractive types, demonstrating high efficiency and directionality. In some embodiments, these designs can use two vertically-offset silicon layers similar to those discussed in "Ultra-Efficient CMOS Fiber-to-Chip Grating Couplers," by Jelena Notaros, et al., Optical Fiber Communications Conference and Exhibition (OFC), IEEE, 2016 ("Notaros" hereafter), which is incorporated herein by reference. FIG. 10A shows a geometry of the non-diffractive optical grating coupler. FIG. 10B shows simulated coupling efficiency for the geometry of FIG. 10A. FIG. 10C shows the widths, period, and offsets of the optical grating coupler elements of the geometry of FIG. 10A. FIG. 10D shows a geometry of the diffractive optical grating coupler. FIG. 10E shows simulated coupling efficiency for the geometry of FIG. 10D.

The beam-turning assembly 100 described herein can support a scalable number of beams in a way that is compatible with low-cost manufacturing. Also, while the beam-turning assembly 100 has been described herein in terms of a single optical beam and single optical fiber axis 121, it should be understood that the beam-turning assembly 100 can include an array of several optical fibers 103, and can be produced from one or more optical fiber ribbons. Also, the beam-turning assembly 100 can incorporate multi-core optical fibers or optical fibers fused or tapered into a multi-core connector.

Figure 11A:
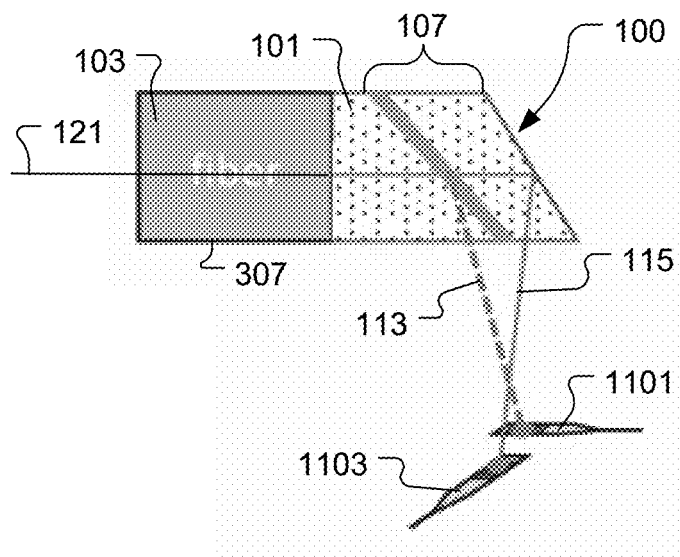
FIG. 11A shows an example of the beam-turning assembly in which the first reflecting region has interfaces approximating the center cleaved arrangement, while the second reflecting region can have interfaces approximating the skewed cleave configuration, in accordance with some embodiments of the present invention.
Figure 11B:
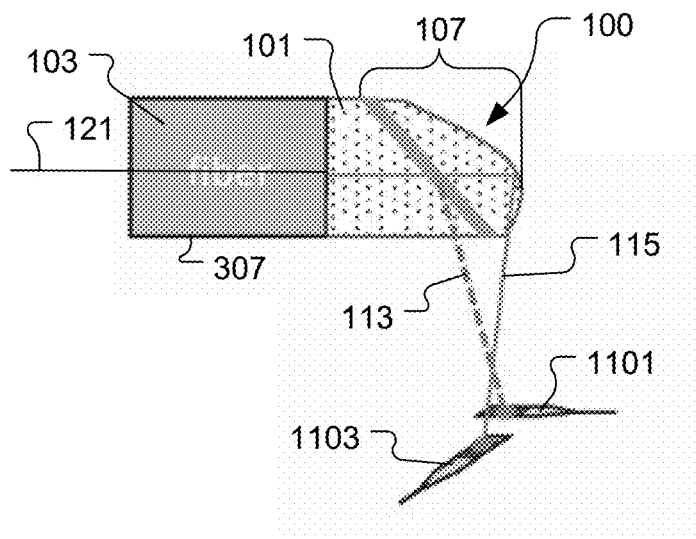
FIG. 11B shows how a non-ideal shape of the outer interface can be formed as more material is deposited and can be adjusted indirectly by modifying the optical fiber's outer surface, and through control during processing of temperature, source direction, viscosity, spin rate, direction relative to earth gravity, etc., in accordance with some embodiments of the present invention.

For ease of fabrication of the multilayer stack 107, the first reflecting region 109 and the second reflecting region 111 have interfaces parallel to each other. However, with a somewhat more complicated fabrication process, the second reflecting region 111 can include one or more interfaces with a normal different from the cleave normal of the first reflecting region 109. This would provide additional freedom in controlling the first reflected beam 113 and the second reflected beam 115 incident on the utilization device. FIG. 11A shows an example of the beam-turning assembly in which the first reflecting region 109 has interfaces approximating the center cleaved arrangement (interface normal in the plane of the optical fiber axis 121 and chip normal 313), while the second reflecting region 111 can have interfaces approximating the skewed cleave configuration (interfaces at 45 degrees to the optical fiber axis 121, but directing the second reflected beam 115 slightly out of the plane of the optical fiber axis 121 and chip normal 313), in accordance with some embodiments of the present invention. As shown FIG. 11A, this configuration allows both optical grating couplers 1101 and 1103 to be the s-polarized type preferable from a optical grating coupler design perspective, and would tend to prevent layout conflicts, so that the first optical grating coupler 1101 can be either co-propagating or counter-propagating. The cleave angles and orientations giving minimum loss and polarization control will differ slightly from the approximations (normal orientation and 45 degree) mentioned above, but can be optimized. The difference in interface orientation for the first reflecting region 109 and the second reflecting region 111 can be arranged by removing material, for example, in a polishing or re-planarizing step. This can produce a flat interface at an explicitly controlled orientation, such as shown in FIG. 11A. Alternatively, it is possible to produces an effective difference in the orientation of the first reflecting region 109 and the second reflecting region 111 by changing the process conditions during deposition of the materials. For example, as more material is deposited, the naturally non-ideal shape of the outer interface, such as shown in FIG. 11B, can be adjusted indirectly by modifying the optical fiber's outer surface, and through control during processing of temperature, source direction, viscosity, spin rate, direction relative to earth gravity, etc.

P-Polarized Optical Grating Coupler

In some embodiments, the first reflected beam 113 and the second reflected beam 115 reach the chip with the same incidence angle, but with two orthogonal polarizations. Therefore, to efficiently couple both the first reflected beam 113 and the second reflected beam 115 onto the chip, it is necessary to have at least one optical grating coupler that can efficiently couple a non-s-polarized beam into a waveguide. This differs from the s-polarized optical grating coupler design, where the beam's propagation direction projected onto the chip is along the same direction as the waveguide. In an example embodiment, the beams are s-polarized and p-polarized relative to the chip incidence, and a p-polarized optical grating coupler design accomplishes coupling of the p-polarized beam.

For optical grating couplers coupling to single-polarization waveguides, the TE-polarized waveguides have an electric field orthogonal to the waveguide propagation direction. If the beam direction projects onto the chip plane 309 along the same axis as the waveguide direction, then it is easier to achieve efficient coupling between the s-polarized beam (which also has electric field perpendicular to the waveguide) than for the p-polarized beam. To achieve coupling to the p-polarized beam, the waveguide direction and beam projection direction should be substantially different, and typically close to orthogonal.

The phase-matching condition can be written most generally as $$k_{wg,x} = k_{beam,x} + k_{gr,x}$$

$$k_{wg,y} = k_{beam,y} + k_{gr,y}$$

if the x axis is the axis of optical grating coupler contrast, then an optical grating coupler with period $\Lambda$ has $k_{gr,x} = 2\pi/\Lambda$, $k_{gr,y} = 0$. The waveguide mode enters with effective index $$k_0 n_{eff,wg} \cos(\theta_{wg}) = k_0 n_{offchip} \sin(\phi)\cos(\theta_{beam}) + 2\pi/\Lambda$$

$$k_0 n_{eff,wg} \sin(\theta_{wg}) = k_0 n_{offchip} \sin(\phi)\sin(\theta_{beam})$$

or equivalently $$n_{eff,wg} \cos(\theta_{wg}) = n_{offchip} \sin(\phi)\cos(\theta_{beam}) + \lambda/\Lambda$$

$$n_{eff,wg} \sin(\theta_{wg}) = n_{offchip} \sin(\phi)\sin(\theta_{beam})$$

Typically the off-chip material index $n_{offchip}$ is relatively small (e.g., index-matched to silica, 1.45) and the angles are small, $n_{eff,wg} > n_{offchip}$, $\sin(\phi) \ll 1$, and $\cos(\theta_{wg}) \sim 1$, so that the phase matching condition is very roughly that the optical grating coupler needs to "stop" the in-plane momentum of the waveguide light: $n_{eff,wg} \sim \lambda/\Lambda$. In the small-angle regime, the optical grating coupler period will be similar to that of s-polarized optical grating couplers.

The y-directed momentum is not changed by an optical grating coupler with $k_{gr,y} = 0$, so that $\sin(\theta_{wg})$ can be zero only if $\sin(\theta_{beam})$ is zero. That is precisely the case discussed above where the beam projection and waveguide are collinear, which is desirable for s-polarized coupling. If the off-chip material index and beam incident angle $\phi$ are fixed, we can estimate the waveguide angle by approximating $\sin(\theta_{beam}) \sim 1$:

$$\theta_{wg} \sim a \sin(n_{offchip} \sin \phi / n_{eff,wg})$$

The waveguide angle will can be in the range of about 4 to about 12 degrees, but preferably in the range of about 6 to about 10 degrees (relative to the direction of periodicity of the optical grating coupler features).

Figure 12A:
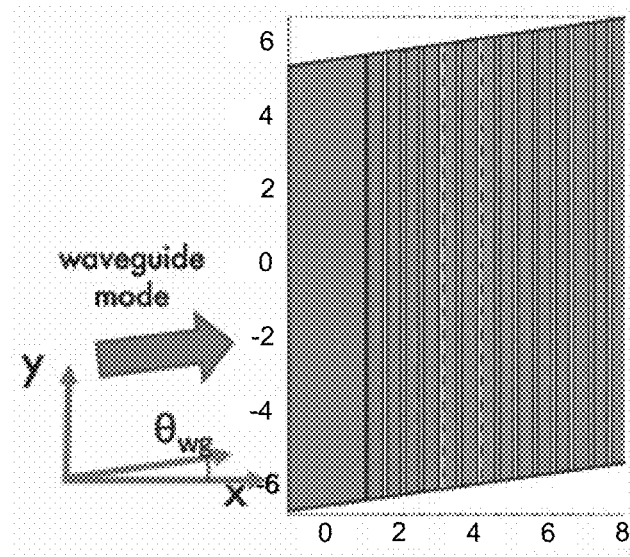
FIG. 12A shows a geometry of the input waveguide and optical grating coupler elements looking down onto the chip, in accordance with some embodiments of the present invention.
Figure 12B:
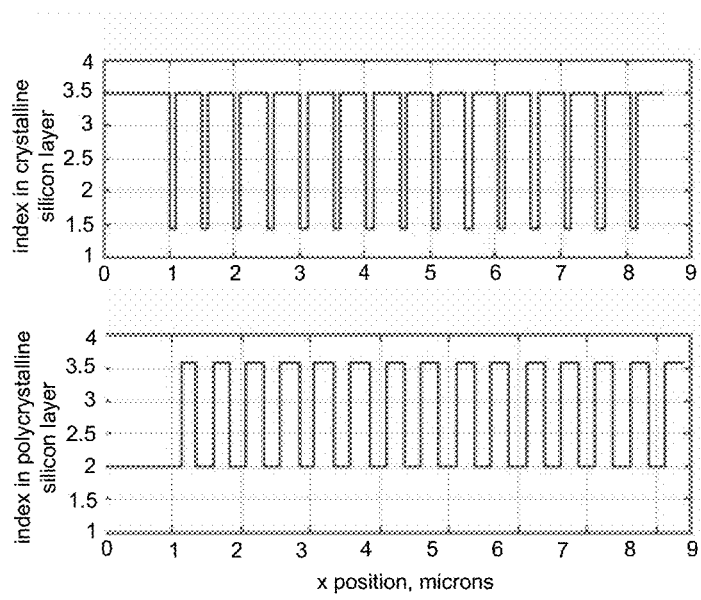
FIG. 12B shows the optical grating coupler elements plotted as refractive index versus x (at y=0 for a z position in either of the layers), in accordance with some embodiments of the present invention.
Figure 12C:
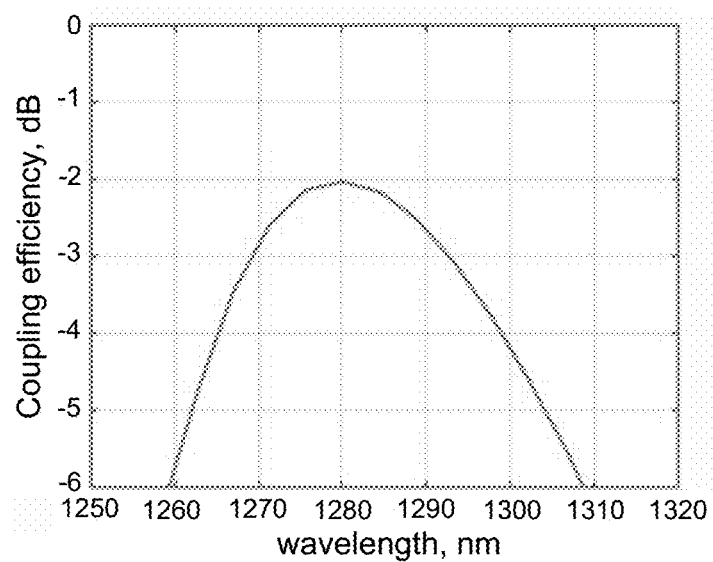
FIG. 12C shows the simulated coupling efficiency plotted versus wavelength, in accordance with some embodiments of the present invention.

FIGS. 12A-12D show the configuration and simulation of an example optical grating coupler for efficient coupling of p-polarized light onto the chip, i.e., an example p-polarized optical grating coupler, in accordance with some embodiments of the present invention. FIGS. 12A-12D also show FDTD calculations confirming that high efficiency coupling is possible. This p-polarized optical grating coupler configuration is non-diffractive, and assumes that the mode of a compact, on-chip waveguide can be adiabatically transformed into the input waveguide mode. FIG. 12A shows a geometry of the input waveguide and optical grating coupler elements looking down onto the chip, with the chip's layer structure similar to what is described in Wade. The waveguide angle is $\theta_{wg}$=8 degrees. This is a two-layer optical grating coupler with elements in the same crystalline silicon layer as the input waveguide (shown as shaded regions) and additional polysilicon optical grating coupler elements in a different vertical layer, shown dashed. FIG. 12B shows the optical grating coupler elements plotted as refractive index versus x (at y=0 for a z position in either of the layers). The design of the p-polarized optical grating coupler is defined by the geometry of the optical grating coupler elements as shown in FIG. 12B. FIG. 12C shows the simulated coupling efficiency plotted versus wavelength. As shown in FIG. 12C, the loss at 1280 nanometers is just above 2 dB.

Figure 12D:
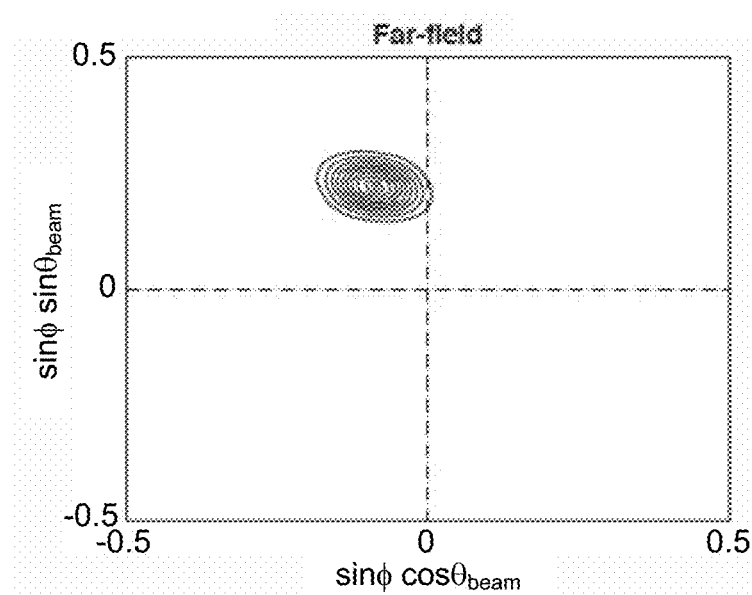
FIG. 12D shows a plot of the far-field indicating that light from the waveguide is coupled into a beam with φ=14 degrees and $\theta_{beam}$=111 degrees, in accordance with some embodiments of the present invention.

FIG. 12D shows a plot of the far-field indicating that light from the waveguide is coupled into a beam with $\phi$=14 degrees and $\theta_{beam}$=111 degrees. The beam direction projected onto the chip plane is roughly but not precisely perpendicular to the waveguide direction, and the p-polarized electric field is roughly but not precisely aligned with the interfaces of the individual optical grating coupler elements (which interfaces are constant-x). High directionality is achieved by including pairs of offset optical grating coupler elements in two vertical layers: about 6% of waveguide light is scattered in the wrong vertical direction. Also, further optimization of the optical grating coupler design is expected to produce improved coupling efficiency.

V-Groove Array with Integrated Turning Prism

Figure 13A:
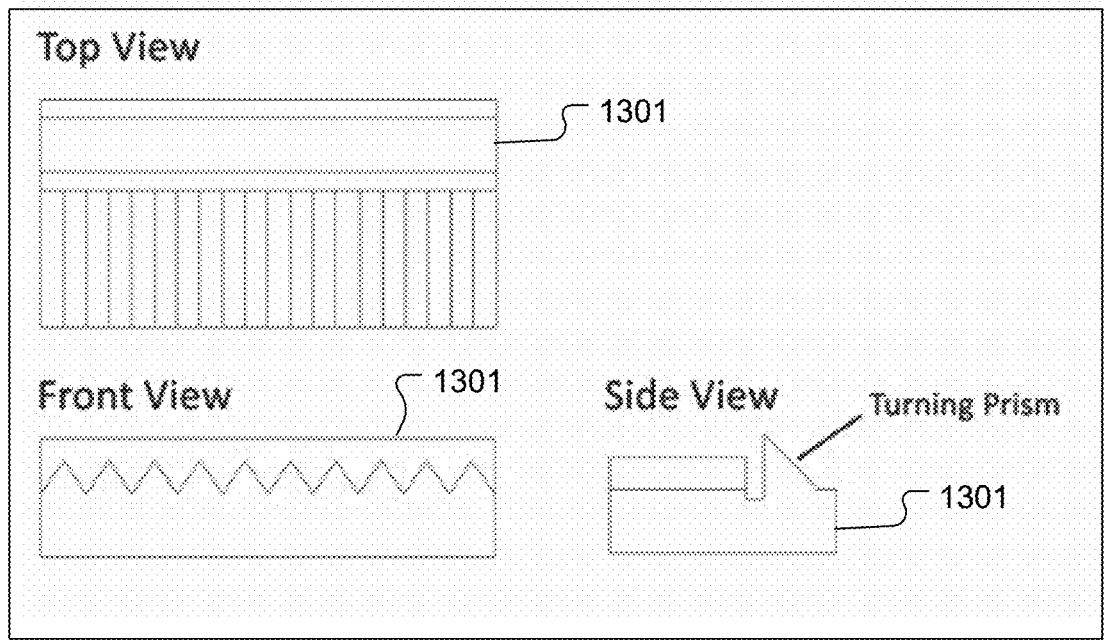
FIGS. 13A and 13B show an example v-groove array with an integrated turning prism, in accordance with some embodiments of the present invention.
Figure 13B:
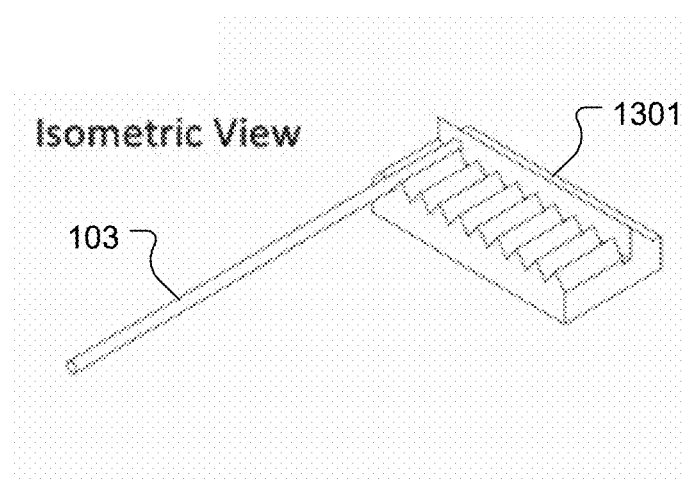

FIGS. 13A and 13B show an example v-groove array 1301 with an integrated turning prism, in accordance with some embodiments of the present invention. The v-groove array 1301 can be batch fabricated at a wafer or panel level, using wafer or panel fabrication techniques. The top surface of the turning prism can have the polarization-splitting multilayer stack 107 as disclosed herein. The v-groove array 1301 allows for a plurality of optical fibers to be precisely aligned to the turning prism. FIG. 13B shows a single optical fiber 103 placed in the v-groove array 1301. It should be understood that the displayed number of optical fibers and/or v-grooves in FIGS. 13A and 13B is for description purposes only, and is in no way limiting.

In some embodiments, the v-groove array 1301 and turning prism is formed from a block of material, such as shown in FIG. 13A. The multilayer stack(s) 107 can then be placed on the turning prism, whose surface plays the same role as the "cleave face" described above. In some embodiments, the block can be fabricated from silica, silicon, or polymer materials. If the material is silicon, or another suitable crystalline material, anisotropic etches, such as KOH or TMAH (tetramethyl ammonium hydroxide) can be used to create angled etches. Alternatively, graytone lithographic techniques can be employed to engineer angled surfaces. If the block is batch fabricated using a wafer, the polarization sensitive multilayer stack 107, including the mirror, can be precisely deposited on the turning prism. Once the block has been patterned, etched, and the appropriate films deposited, standard dicing techniques can be used to singulate the blocks.

Anti-reflection designs may be beneficial at any of the interfaces that might produce unwanted reflections, and may be important for reducing light returning to an optical source. For example, anti-reflective designs (including angling the interface slightly as well as adding specific anti-reflective layers or coatings) could be employed at the interface where light from the optical fiber enters the block of the v-groove array 1301, and may be particularly important if there is a large change in refractive index at this interface. Similarly, anti-reflection approaches may be used if two of the optical fibers in the assembly have substantially different index, as would be the case if the end-cap material were made of highly doped silica, etc.

As disclosed herein, an optical assembly can include a base structure configured to receive an optical fiber. For example, in some embodiments, the v-groove array 1301 of FIG. 13A is an example base structure configured to receive the optical fiber 103. However, it should be understood that in other embodiments the base structure can be configured different from the v-groove array 1301, so long as the base structure provides for receipt and alignment of an optical fiber. More specifically, the base structure is configured to align an axis of a core of the optical fiber in a prescribed direction. The optical assembly also includes an angled reflector spatially indexed to the base structure. For example, in some embodiments, the angled reflector can be configured as the beam-turning assembly 100. The angled reflector is positioned to receive light from the core of the optical fiber, when the optical fiber is positioned on the base structure. The angled reflector is configured to reflect a first polarization of the received light as a first reflected beam, such as the first reflected beam 113, toward a first optical coupling site on a photonic chip. The angled reflector is also configured to reflect a second polarization of the received light as a second reflected beam, such as the second reflected beam 115, toward a second optical coupling site on the photonic chip. In some embodiments, the first optical coupling site is a first vertical optical grating coupler formed within the photonic chip, and the second optical coupling site is a second vertical optical grating coupler formed within the photonic chip.

In some embodiments, the angled reflector is configured to direct the first reflected beam toward the first optical grating coupler at an angle that efficiently couples light from the first reflected beam into the first optical grating coupler. Also, the angled reflector is configured to direct the second reflected beam toward the second optical grating coupler at an angle that efficiently couples light from the second reflected beam into the second optical grating coupler. In some embodiments, a center of the first reflected beam is separated from a center of the second reflected beam by a beam spacing as measured within the plane of incidence where the first reflected beam is incident upon the first optical coupling site and the second reflected beam is incident upon the second optical coupling site, where the beam spacing is within a range extending from about 5 micrometers to about 20 micrometers, or within a range extending from about 5 micrometers to about 100 micrometers, or within a range extending from about 5 micrometers to about 125 micrometers, or within a range extending from about 5 micrometers to about 200 micrometers, or within a range extending from about 5 micrometers to about 500 micrometers, or within a range extending from about 5 micrometers to about 750 micrometers, or within a range extending from about 5 micrometers to about 1000 micrometers, or within a range extending from about 5 micrometers to about 4000 micrometers. In some embodiments, a center of the first reflected beam is separated from a center of the second reflected beam by a beam spacing as measured within the plane of incidence where the first reflected beam is incident upon the first optical coupling site and the second reflected beam is incident upon the second optical coupling site, where the beam spacing is greater than a largest mode-field diameter of the first reflected beam and the second reflected beam with the plane of incidence. In some embodiments, a total thickness of the angled reflector (e.g., the total thickness (at) of the first reflecting region 109 and the second reflecting region 111 and the spacing layer(s) 117 between them as shown in FIG. 3A) is less than an outer diameter of the optical fiber. It should be understood that the angled reflector is configured so that both the first reflected beam and the second reflected beam are incident upon the same photonic chip.

In some embodiments, the angled reflector includes a first reflecting region, such as the first reflecting region 109, and a second reflecting region, such as second reflecting region 111, collectively configured so that a portion of light received by the angled reflector from the core of the optical fiber is transmitted through the first reflecting region and is reflected by the second reflecting region. In some embodiments, the first reflecting region includes a layered structure including layer interfaces approximately satisfying a Brewster condition. In some embodiments, the first reflecting region includes a polarization-sensitive reflector having a higher reflectance for s-polarization than for p-polarization. In some embodiments, the angled reflector includes a multilayer structure. In some embodiments, a layer of the multilayer structure of the angled reflector is formed directly on an angle-cut surface of the optical fiber.

In some embodiments, the base structure includes the v-groove array 1301 configured to receive multiple optical fibers in respective v-grooves of the v-groove array 1301. Each v-groove of the v-groove array 1301 is configured to align an axis of a core of a corresponding optical fiber in the prescribed direction. The optical assembly can also include a turning prism connected to the base structure, such as shown in FIG. 13A, where the angled reflector includes a multilayer structure formed on the turning prism.

Figure 14:
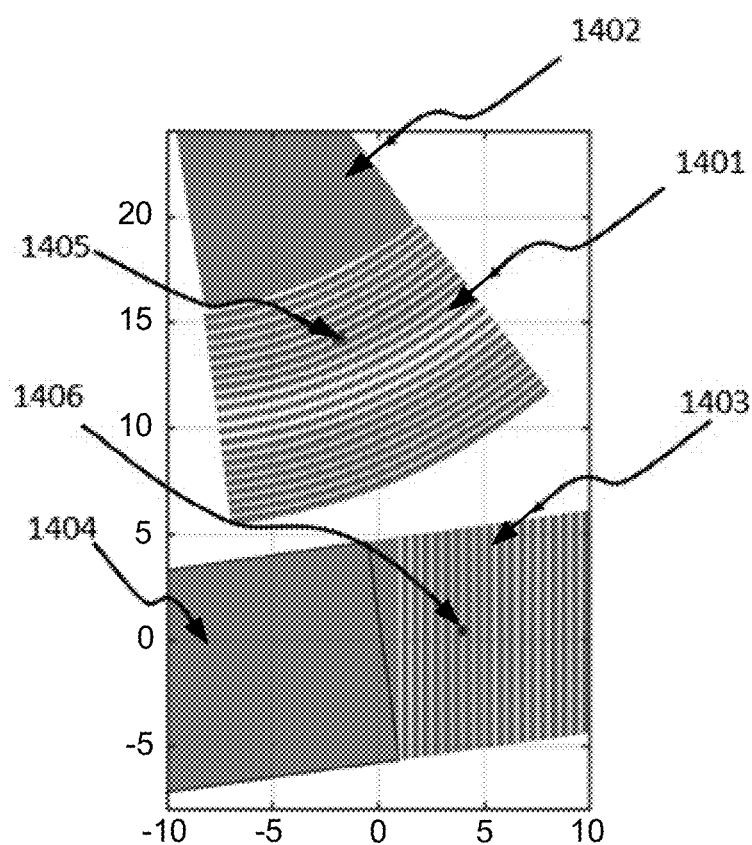
FIG. 14 illustrates how a pair of optical grating couplers may be positioned on-chip, in accordance with some embodiments of the present invention.

FIG. 14 illustrates how a pair of optical grating couplers may be positioned on-chip in accordance with some embodiments of the present invention. A first optical grating coupler 1401 is placed to efficiently couple the first reflected beam 113 having a beam center 1405 into an on-chip taper 1402. A second optical grating coupler 1403 is placed to simultaneously couple the second reflected beam 115 having a beam center 1406 into an on-chip taper 1404. These tapers 1402 and 1404 couple optical signals into waveguides suitable for on-chip routing. In the example of FIG. 14, the first taper 1402 is shown as a diffractive (compact) taper, and the second taper 1404 is shown as an adiabatic taper. However, it should be understood that in various embodiments, the tapers 1402 and 1404 can be adiabatic, diffractive, or of essentially any other type of taper suitable for use with the optical grating couplers 1401 and 1403.

FIG. 15 shows a flowchart of a method for turning light from an optical fiber into a chip, in accordance with some embodiments of the present invention. The method includes an operation 1501 for placing a first reflecting region at an end of the optical fiber. The first reflecting region includes a polarization-sensitive reflector configured to selectively reflect a first polarization of light emanating from the optical fiber into a first reflected beam. The first reflecting region is also configured to transmit light emanating from the optical fiber that is not of the first polarization. The first reflected beam is directed toward a first optical grating coupler on the chip. The method also includes an operation 1503 for placing a spacer layer on the first reflecting region such that light transmitted from the first reflecting region enters and passes through the spacer layer. The method also includes an operation 1505 for placing a second reflecting region on the spacer layer. The second reflecting region is configured to reflect light that is incident upon the second reflecting region into a second reflected beam. The second reflected beam is directed toward a second optical grating coupler on the chip. The method also includes an operation 1507 for using a thickness of the spacer layer to control a separation distance between the first reflected beam and the second reflected beam.

Figure 16:
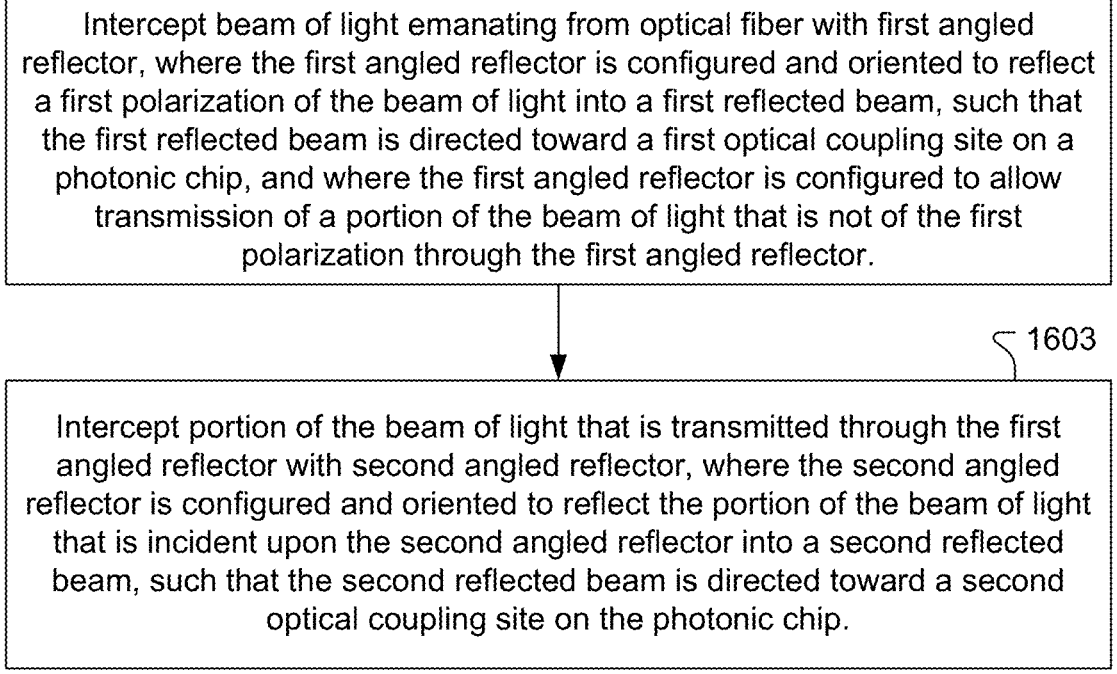
FIG. 16 shows a flowchart of a method for turning light from an optical fiber into a chip, in accordance with some embodiments of the present invention.

FIG. 16 shows a flowchart of a method for turning light from an optical fiber into a chip, in accordance with some embodiments of the present invention. The method includes an operation 1601 for intercepting a beam of light emanating from an optical fiber with a first angled reflector, where the first angled reflector is configured and oriented to reflect a first polarization of the beam of light into a first reflected beam, such that the first reflected beam is directed toward a first optical coupling site on a photonic chip. The first angled reflector is also configured to allow transmission of a portion of the beam of light that is not of the first polarization through the first angled reflector. The method also includes an operation 1603 for intercepting the portion of the beam of light that is transmitted through the first angled reflector with a second angled reflector, where the second angled reflector is configured and oriented to reflect the portion of the beam of light that is incident upon the second angled reflector into a second reflected beam, such that the second reflected beam is directed toward a second optical coupling site on the photonic chip.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in other embodiments, even if not specifically shown or described. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the example embodiments disclosed herein are to be considered as illustrative and not restrictive, and the invention is not to be limited to the details given herein, but may be modified within the scope and equivalents of the described embodiments.

What is claimed is:

1. An optical beam-turning assembly, comprising:
a first reflecting region positioned at an end of an optical fiber, the first reflecting region including a polarization-sensitive reflector configured to selectively reflect a first polarization of light emanating from the optical fiber into a first reflected beam, the first reflecting region also configured to transmit light emanating from the optical fiber that is not of the first polarization, the first reflected beam directed toward a first optical grating coupler on a chip;
a spacer layer disposed on the first reflecting region such that light transmitted from the first reflecting region enters and passes through the spacer layer; and
a second reflecting region disposed on the spacer layer, the second reflecting region configured to reflect light that is incident upon the second reflecting region into a second reflected beam, the second reflected beam directed toward a second optical grating coupler on the chip,
wherein a thickness of the spacer layer is set to control a separation distance between the first reflected beam and the second reflected beam.

2. The optical beam-turning assembly as recited in claim 1, wherein the first reflecting region is formed as a multi-layer stack of alternating layers of materials.

3. The optical beam-turning assembly as recited in claim 1, wherein the polarization-sensitive reflector of the first reflecting region is a Bragg reflector that includes a stack layered materials.

4. The optical beam-turning assembly as recited in claim 3, wherein the Bragg reflector is configured so that p-polarized light is not reflected by layer interfaces within the Bragg reflector.

5. The optical beam-turning assembly as recited in claim 1, wherein the second reflected beam passes through both the spacer layer and the first reflecting region as the second reflected beam travels from the second reflecting region to the second optical grating coupler on the chip.

6. The optical beam-turning assembly as recited in claim 1, wherein the second reflected beam passes through the spacer layer as the second reflected beam travels from the second reflecting region to the second optical grating coupler on the chip, and wherein the second reflected beam does not pass through the first reflecting region as the second reflected beam travels from the second reflecting region to the second optical grating coupler on the chip.

7. The optical beam-turning assembly as recited in claim 1, wherein the spacer layer is configured to perform a polarization-rotation of light transmitted through the first reflecting region, such that the first reflected beam and the second reflected beam have a substantially same polarization upon reaching the first optical grating coupler and the second optical grating coupler, respectively.

8. The optical beam-turning assembly as recited in claim 1, wherein the first optical grating coupler and the second optical grating coupler are parts of physically separate optical components on the chip.

9. The optical beam-turning assembly as recited in claim 1, wherein the first optical grating coupler is a single-polarization optical grating coupler.

10. The optical beam-turning assembly as recited in claim 1, wherein the first optical grating coupler is counter-propagating relative to the optical fiber.

11. The optical beam-turning assembly as recited in claim 1, wherein the first optical grating coupler is s-polarized, and wherein the second optical grating coupler is p-polarized.

12. The optical beam-turning assembly as recited in claim 11, wherein the second optical grating coupler includes a waveguide oriented approximately perpendicular to the waveguide of the first optical grating coupler.

13. The optical beam-turning assembly as recited in claim 11, wherein the second optical grating coupler includes a cross-propagating waveguide.

14. The optical beam-turning assembly as recited in claim 1, wherein a first material layer of the first reflecting region is deposited directly on the end of the optical fiber.

15. The optical beam-turning assembly as recited in claim 1, further comprising:
an end-cap connected to the end of the optical fiber at a position between the end of the optical fiber and the first reflecting region, wherein a first material layer of the first reflecting region is deposited directly on the end-cap.

16. A method for turning light from an optical fiber into a chip, comprising:
placing a first reflecting region at an end of the optical fiber, the first reflecting region including a polarization-sensitive reflector configured to selectively reflect a first polarization of light emanating from the optical fiber into a first reflected beam, the first reflecting region also configured to transmit light emanating from the optical fiber that is not of the first polarization, the first reflected beam directed toward a first optical grating coupler on the chip;
placing a spacer layer on the first reflecting region such that light transmitted from the first reflecting region enters and passes through the spacer layer;
placing a second reflecting region on the spacer layer, the second reflecting region configured to reflect light that is incident upon the second reflecting region into a second reflected beam, the second reflected beam directed toward a second optical grating coupler on the chip; and
using a thickness of the spacer layer to control a separation distance between the first reflected beam and the second reflected beam.

17. An optical assembly, comprising:
a base structure configured to receive an optical fiber, the base structure configured to align an axis of a core of the optical fiber in a prescribed direction; and
an angled reflector spatially indexed to the base structure, the angled reflector positioned to receive light from the core of the optical fiber, the angled reflector configured to reflect a first polarization of the received light as a first reflected beam toward a first optical coupling site on a photonic chip, the angled reflector configured to reflect a second polarization of the received light as a second reflected beam toward a second optical coupling site on the photonic chip.

18. The optical assembly as recited in claim 17, wherein the first optical coupling site is a first vertical optical grating coupler, and wherein the second optical coupling site is a second vertical optical grating coupler, wherein the angled reflector is configured to direct the first reflected beam toward the first optical grating coupler at an angle that efficiently couples light from the first reflected beam into the first optical grating coupler, and wherein the angled reflector is configured to direct the second reflected beam toward the second optical grating coupler at an angle that efficiently couples light from the second reflected beam into the second optical grating coupler.

19. The optical assembly as recited in claim 17, wherein a spacing between a center of the first reflected beam and a center of the second reflected beam is within a range extending from about 5 micrometers to about 20 micrometers within a plane where the first reflected beam is incident upon the first optical coupling site and the second reflected beam is incident upon the second optical coupling site.

20. The optical assembly as recited in claim 17, wherein a center of the first reflected beam is separated from a center of the second reflected beam by a beam spacing as measured within a plane of incidence where the first reflected beam is incident upon the first optical coupling site and the second reflected beam is incident upon the second optical coupling site, wherein the beam spacing is greater than a largest mode-field diameter of the first reflected beam and the second reflected beam with the plane of incidence.

21. The optical assembly as recited in claim 17, wherein the angled reflector includes a first reflecting region and a second reflecting region collectively configured so that a portion of light received by the angled reflector from the core of the optical fiber is transmitted through the first reflecting region and is reflected by the second reflecting region, and wherein the first reflecting region includes a polarization-sensitive reflector having a higher reflectance for s-polarization than for p-polarization.

22. The optical assembly as recited in claim 21, wherein the first reflecting region includes a layered structure including layer interfaces approximately satisfying a Brewster condition.

23. The optical assembly as recited in claim 17, wherein the angled reflector includes a multilayer structure, and wherein a layer of the multilayer structure is formed directly on an angle-cut surface of the optical fiber.

24. The optical assembly as recited in claim 17, wherein the base structure includes a v-groove array configured to receive multiple optical fibers in respective v-grooves of the v-groove array, wherein each v-groove of the v-groove array is configured to align an axis of a core of a corresponding optical fiber in the prescribed direction, wherein the optical assembly includes a turning prism connected to the base structure, wherein the angled reflector includes a multilayer structure formed on the turning prism.

25. The optical assembly as recited in claim 17, wherein a total thickness of the angled reflector is less than an outer diameter of the optical fiber.

26. A method for turning light from an optical fiber into a chip, comprising:
intercepting a beam of light emanating from an optical fiber with a first angled reflector, wherein the first angled reflector is configured and oriented to reflect a first polarization of the beam of light into a first reflected beam, such that the first reflected beam is directed toward a first optical coupling site on a photonic chip, and wherein the first angled reflector is configured to allow transmission of a portion of the beam of light that is not of the first polarization through the first angled reflector; and
intercepting the portion of the beam of light that is transmitted through the first angled reflector with a second angled reflector, wherein the second angled reflector is configured and oriented to reflect the portion of the beam of light that is incident upon the second angled reflector into a second reflected beam, such that the second reflected beam is directed toward a second optical coupling site on the photonic chip.

* * * * *